US012627464B2

(12) United States Patent
Weng et al.

(10) Patent No.: US 12,627,464 B2
(45) Date of Patent: May 12, 2026

(54) BOOTSTRAPPABLE FULLY HOMOMORPHIC ATTRIBUTE-BASED ENCRYPTION METHOD WITH UNBOUNDED CIRCUIT DEPTH

(71) Applicants: Jinan University, Guangzhou (CN); The Hong Kong Polytechnic University, Hong Kong (CN); Nanyang Technological University, Jurong West (SG)

(72) Inventors: Jian Weng, Guangzhou (CN); Shixin Chen, Guangzhou (CN); Feixiang Zhao, Hong Kong (CN); Man Ho Allen Au, Hong Kong (CN); Huaxiong Wang, Jurong West (SG); Jian Guo, Jurong West (SG); Chengxin Shu, Guangzhou (CN)

(73) Assignees: Jinan University, Guangzhou (CN); The Hong Kong Polytechnic University, Hong Kong (CN); Nanyang Technological University, Jurong West (SG)

( * ) Notice: Subject to any disclaimer, the term of this patent is extended or adjusted under 35 U.S.C. 154(b) by 0 days.

(21) Appl. No.: 19/419,577

(22) Filed: Dec. 15, 2025

(65) Prior Publication Data

US 2026/0106727 A1    Apr. 16, 2026

(51) Int. Cl.
    H04L 9/00         (2022.01)
    H04L 9/08         (2006.01)
    H04L 9/14         (2006.01)
(52) U.S. Cl.
    CPC ............ H04L 9/008 (2013.01); H04L 9/0894 (2013.01); H04L 9/14 (2013.01)

(58) Field of Classification Search
    CPC .......... H04L 9/008; H04L 9/0894; H04L 9/14
    See application file for complete search history.

(56) References Cited

U.S. PATENT DOCUMENTS

2021/0111864 A1*  4/2021  Gentry .................. H04L 9/3093
2022/0045865 A1*  2/2022  Mukherjee ........... H04L 9/3247
                    (Continued)

OTHER PUBLICATIONS

Fully Homomorphic Encryption, MIT 6.5630/6.876 (Fall 2024), Lecture 4 (Year: 2024).*

(Continued)

*Primary Examiner* — Zahid Choudhury

(57)                ABSTRACT

Homomorphic attribute-based encryption (HABE) is a useful cryptographic primitive that supports both fine-grained access control and computation over ciphertexts. However, existing HABE schemes are limited to the homomorphic evaluation of circuits with either bounded depth or a restricted number of inputs. To address this problem, the present disclosure introduce a bootstrappable, fully homomorphic attribute-based encryption (FHABE) scheme that supports computations of circuits with unbounded depth over cross-attribute ciphertexts. Compared to state-of-the-art schemes, the proposed scheme also has a more lightweight ciphertext and eliminates the reliance on the random oracle model. Additionally, the present disclosure extend the FHABE to a proxy re-encryption setting, proposing an attribute-based homomorphic proxy re-encryption scheme that facilitates efficient sharing of encrypted data. This scheme is the first lattice-based multi-hop attribute-based proxy re-encryption scheme with unbounded hops of re-encryptions.

18 Claims, 3 Drawing Sheets

(56) References Cited

U.S. PATENT DOCUMENTS

| | | | |
|---|---|---|---|
| 2023/0291540 A1* | 9/2023 | Paillier | ............... H04L 9/008 |
| 2023/0388116 A1* | 11/2023 | Sehrawat | ............... H04L 9/16 |
| 2025/0300807 A1* | 9/2025 | Vrubel | ............... H04L 9/3026 |

OTHER PUBLICATIONS

Ilaria Chillotti et al., "Faster Fully Homomorphic Encryption: Bootstrapping in less than 0.1 Seconds", In: Advances in Cryptology—ASIACRYPT 2016. vol. 10031, Nov. 9, 2016 pp. 3-33.

Ilaria Chillotti et al., "TFHE: Fast Fully Homomorphic Encryption Over the Torus", Journal of Cryptology, vol. 33, Mar. 21, 2019, pp. 34-91.

Michael Clear et al., "Attribute-Based Fully Homomorphic Encryption with a Bounded Number of Inputs", Progress in Cryptology—AFRICACRYPT 2016, vol. 3, No. 4, Apr. 7, 2016, pp. 307-324.

Léo Ducas et al., "FHEW: Bootstrapping Homomorphic Encryption in Less Than a Second", Advances in Cryptology—EUROCRYPT 2015, vol. 9056, Apr. 14, 2015, pp. 617-640.

Feixiang Zhao et al., "Bootstrappable Fully Homomorphic Attribute-Based Encryption with Unbounded Circuit Depth", Advances in Cryptology—ASIACRYPT 2025, LNCS 16251, Dec. 8, 2025, pp. 230-262.

* cited by examiner

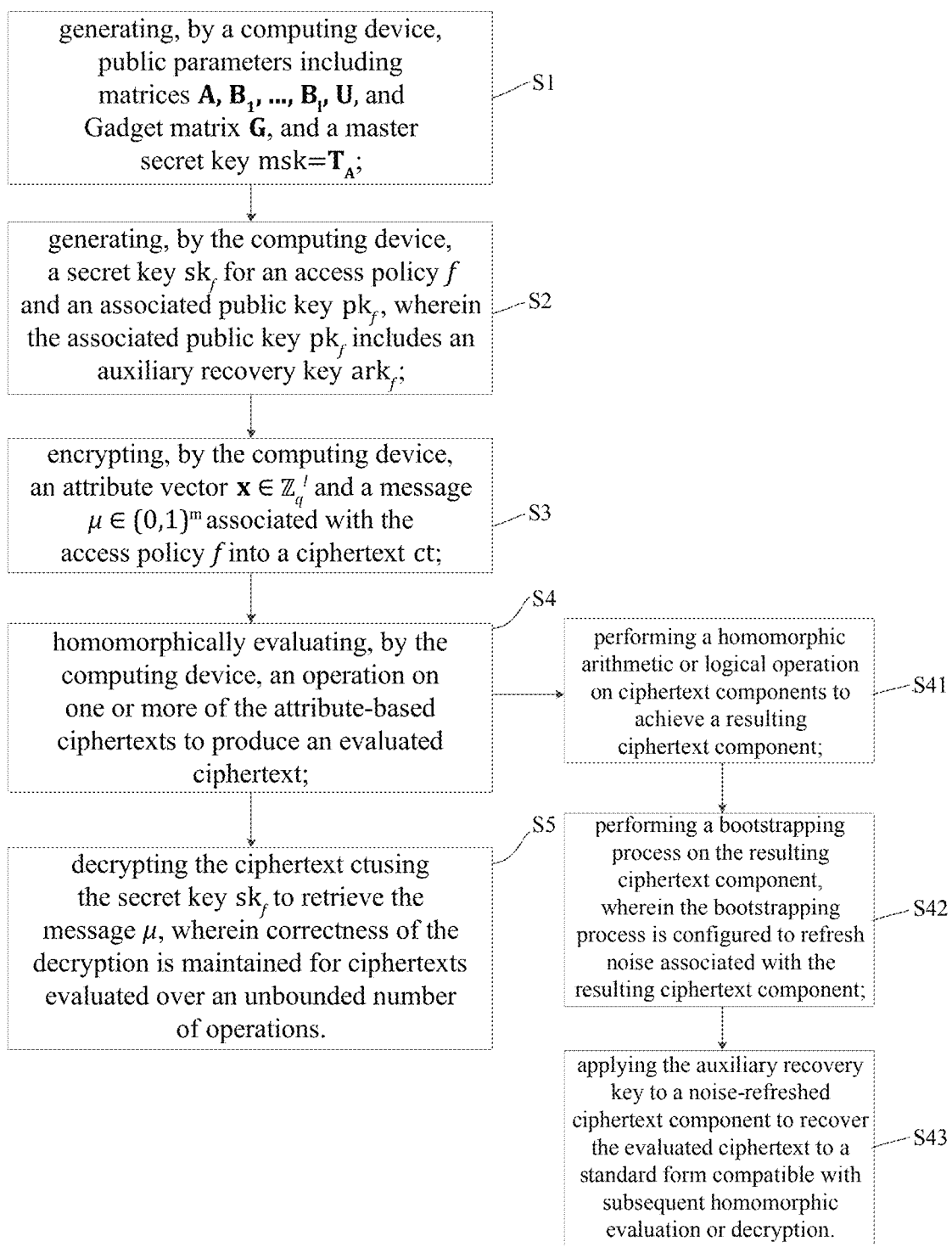

generating, by a computing device, public parameters including matrices $\mathbf{A}, \mathbf{B_1}, ..., \mathbf{B_l}, \mathbf{U}$, and Gadget matrix $\mathbf{G}$, and a master secret key msk=$\mathbf{T_A}$;
— S1 generating, by the computing device, a secret key $sk_f$ for an access policy $f$ and an associated public key $pk_f$, wherein the associated public key $pk_f$ includes an auxiliary recovery key $ark_f$;
— S2 encrypting, by the computing device, an attribute vector $\mathbf{x} \in \mathbb{Z}_q^l$ and a message $\mu \in \{0,1\}^m$ associated with the access policy $f$ into a ciphertext ct;
— S3 homomorphically evaluating, by the computing device, an operation on one or more of the attribute-based ciphertexts to produce an evaluated ciphertext;
— S4 performing a homomorphic arithmetic or logical operation on ciphertext components to achieve a resulting ciphertext component;
— S41 decrypting the ciphertext ct using the secret key $sk_f$ to retrieve the message $\mu$, wherein correctness of the decryption is maintained for ciphertexts evaluated over an unbounded number of operations.
— S5 performing a bootstrapping process on the resulting ciphertext component, wherein the bootstrapping process is configured to refresh noise associated with the resulting ciphertext component;
— S42 applying the auxiliary recovery key to a noise-refreshed ciphertext component to recover the evaluated ciphertext to a standard form compatible with subsequent homomorphic evaluation or decryption.
— S43

FIG. 2

BOOTSTRAPPABLE FULLY HOMOMORPHIC ATTRIBUTE-BASED ENCRYPTION METHOD WITH UNBOUNDED CIRCUIT DEPTH

TECHNICAL FIELD

The present invention relates generally to cryptography, and more particularly, to computer-implemented systems and methods for secure data processing in multi-user and untrusted environments. Specifically, the invention pertains to fully homomorphic attribute-based encryption (FHABE) schemes and attribute-based fully homomorphic proxy re-encryption (AB-FHPRE) schemes that enable fine-grained access control and arbitrary computations on encrypted data.

BACKGROUND

The increasing demand for secure data processing in distributed and multi-user environments, such as cloud computing and outsourced data storage, necessitates advanced cryptographic primitives capable of both granular access control and computations over encrypted information. Two foundational technologies address these needs: Attribute-Based Encryption (ABE) and Homomorphic Encryption (HE).

Attribute-Based Encryption (ABE) allows for fine-grained access control, where data can be encrypted such that only users possessing a specific set of attributes or a secret key derived from an access policy can decrypt the ciphertext. This enables flexible sharing and management of encrypted data across various users. However, conventional ABE schemes are limited to controlling access and do not intrinsically support computations on the encrypted data itself.

Homomorphic Encryption (HE) is a cryptographic primitive that enables computations directly on encrypted data without prior decryption, thereby preserving data confidentiality throughout the computation process. Fully Homomorphic Encryption (FHE) schemes, pioneered by Gentry, support arbitrary computations by utilizing a bootstrapping mechanism to refresh ciphertexts, thereby controlling the accumulation of noise that otherwise limits the number of operations. Advances like FHEW (Ducas and Micciancio) and GINX/TFHE (Chillotti et al.) have significantly improved bootstrapping efficiency. Despite these advancements, traditional FHE schemes primarily operate in a one-to-one model, where encryptions are typically tied to a single user and computations are confined to ciphertexts under the same user's key. This model often lacks the ability to enforce fine-grained access control in multi-user scenarios, such as large organizations requiring data accessibility and manipulability by designated staff members based on their roles or attributes.

To address the combined requirements of computation and fine-grained access, Homomorphic Attribute-Based Encryption (HABE) schemes have been proposed, integrating functionalities from both HE and ABE. Early HABE constructions, such as those based on GSW-FHE, enabled computations only over ciphertexts encrypted under the same attribute set. Subsequent developments introduced Target HABE (T-HABE), which supports computations over cross-attribute ciphertexts. T-HABE is generally categorized into Single-Target HABE (ST-HABE) and Multi-Target HABE (MT-HABE) based on the number of policies supported during computations.

Below is a detailed analysis of the current technical limitations:

Despite these advancements, existing HABE schemes face significant technical limitations that hinder their practical applicability, particularly in complex computational environments:

A paramount limitation of prior art ST-HABE and MT-HABE schemes is their restriction to processing circuits with a predetermined or prior bounded depth. Practical applications often require computations involving complex circuits with unpredictable or effectively unbounded depths. The inability to support such unbounded circuit depth operations severely constrains the computational capacity of these schemes. Specifically, in schemes like BCTW-HABE, the correctness of decryption of homomorphically evaluated ciphertexts is contingent upon the accumulated noise remaining below a certain threshold. The error in an evaluated ciphertext typically grows multiplicatively with each operation, as demonstrated by the formula $$d_G \leq \log_M\left(\frac{q}{4(\tau m\sqrt{m} + N + 1)B}\right),$$

where $d_G$ is the maximum supported circuit depth, $\tau$, $m$, $N$, $B$ are lattice and error parameters. This rapid error growth inherently imposes a significant constraint on the maximum permissible circuit depth.

The parameter sizes in conventional HABE schemes tend to increase substantially with the required circuit depth. This dependency on circuit depth for parameter scaling leads to significant scalability limitations, making these schemes impractical for real-world applications demanding complex or deep computations.

Some proposed HABE constructions, while aiming for unbounded depth, have remained incomplete solutions. For instance, certain schemes may restrict the number of inputs for homomorphic computations or support only "1-hop" computations, meaning evaluated ciphertexts cannot be further processed or re-encrypted. This limitation prevents the construction of complex, multi-stage evaluation processes.

Another technical drawback of some existing HABE schemes is their reliance on the random oracle model for functionalities like secret key generation. Such reliance can sometimes be a concern for provable security in the standard model.

While bootstrapping offers a potential solution to mitigate error accumulation and enable unbounded depth, its direct integration into current HABE schemes presents unique challenges. Bootstrapping typically requires the encryption of secret key bits as part of the public key and necessitates non-interactively deriving attribute or policy information from such keys, which is particularly intricate within the HABE framework. Furthermore, existing HABE schemes support only 1-bit message encryption per ciphertext, leading to excessive ciphertext expansion. For example, BCTW-HABE's ciphertext for a 1-bit message includes two matrices: $C \in \mathbb{Z}_q^{(m+N+1)\times M}$ and $C_x \in \mathbb{Z}_q^{lm \times M}$, where $M=(m+N+1)$ $\lceil \log q \rceil$. For multi-bit messages, ciphertext size scales linearly with the number of bits, increasing storage and transmission overhead. Additionally, Clear-McGoldrick's generic unbounded HABE lacks a concrete instantiation and restricts input ciphertext counts to 1-hop, making it impractical.

Existing attribute-based proxy re-encryption (AB-PRE) schemes often lack the ability to support multi-hop re-encryptions without depth limitations or to incorporate full homomorphic capabilities, which restricts their utility in dynamic data sharing and evolving access control scenarios. The current AB-PRE schemes (e.g., lattice-based HRA-secure AB-PRE) have two key limitations: 1) No Fully Homomorphic Computations: Existing AB-PRE schemes only support re-encryption, not homomorphic operations on ciphertexts. Users cannot process encrypted data (e.g., aggregate, filter) before or after re-encryption, limiting flexibility in data sharing. 2) Bounded Re-encryption Hops: Re-encrypted ciphertexts accumulate error with each hop, and existing schemes lack a mechanism to refresh error. This restricts re-encryptions to a fixed number of hops (e.g., 1-hop or 2-hop), preventing large-scale, multi-hop data sharing (e.g., across multiple departments or organizations).

These limitations highlight a pressing need for a robust and scalable HABE scheme that can support homomorphic computations of arbitrary complexity (unbounded depth) over cross-attribute ciphertexts, while simultaneously offering efficient re-encryption capabilities across multiple policies without compromising security or performance.

To overcome the deficiencies of the prior art, the present disclosure provides a novel bootstrappable fully homomorphic attribute-based encryption (FHABE) system and method with unbounded circuit depth, and an extended multi-hop attribute-based fully homomorphic proxy re-encryption (AB-FHPRE) system and method. These innovations directly address the technical problems of bounded circuit depth, scalability, incomplete functionality, and restricted re-encryption capabilities inherent in conventional schemes.

SUMMARY

The present invention achieves unbounded depth and multi-hop re-encryption by integrating advanced bootstrapping techniques with a novel attribute-based encryption framework.

Key technical solutions include: 1) Integrating FHEW-based bootstrapping mechanisms to precisely control noise growth, allowing for an unlimited number of homomorphic operations without needing circuit-depth-dependent parameter scaling. 2) Introducing an auxiliary recovery key (ARK) and associated recovery mechanisms to restore bootstrapped ciphertexts from an expanded key form to a standard, functional ciphertext structure, ensuring compatibility with subsequent evaluation or decryption. 3) Developing specific homomorphic evaluation algorithms (e.g., Eval.NAND) that leverage component-wise bootstrapping to support the computational input of ABE ciphertext, while simultaneously perform parallel processing and efficient noise management. 4) Constructing a novel multi-hop AB-FHPRE scheme that supports an unbounded number of re-encryption hops, enabling dynamic policy updates and secure data sharing across multiple proxies without plaintext exposure.

This is achieved through precisely defined re-encryption key (ReKeyGen) and re-encryption (ReEnc) algorithms with rigorous error bounds. Utilizing lattice-based cryptographic primitives to provide quantum resistance. Eliminating the reliance on the random oracle model, enhancing the provable security of the schemes. The disclosed systems and methods provide a practical and efficient solution for secure and flexible data processing in complex multi-user and multi-policy environments, such as cloud-based encrypted analytics, distributed file systems, and cross-organization data sharing, offering a significant improvement over the limitations of existing cryptographic primitives.

The present disclosure provides a computer-implemented system for fully homomorphic attribute-based encryption (FHABE) with unbounded circuit depth, comprising:

a processor configured to execute instructions; and a memory coupled to the processor and storing instructions configured to cause the processor to perform operations comprising:

generating public parameters including matrices A, $B_1$, . . . , $B_l$, U and Gadget matrix $G=I_n\otimes g^T$, and a master secret key msk;

generating a secret key $sk_f$ for an access policy $f$ and an associated public key $pk_f$, wherein the associated public key $pk_f$ includes an auxiliary recovery key $ark_f$;

encrypting an attribute vector x∈

$$\mathbb{Z}_q^l$$

and a message $\mu\in(0,1)^m$ associated with the access policy $f$ into a ciphertext $ct_x$;

homomorphically evaluating an operation on one or more of the ciphertexts to produce an evaluated ciphertext, wherein the homomorphic evaluation comprises:

performing a homomorphic arithmetic or logical operation on ciphertext components to achieve a resulting ciphertext component;

performing a bootstrapping process on the resulting ciphertext component, wherein the bootstrapping process is configured to refresh noise associated with the resulting ciphertext component; and applying the auxiliary recovery key $ark_f$ to a noise-refreshed ciphertext component to recover the evaluated ciphertext to a standard form compatible with subsequent homomorphic evaluation or decryption; and decrypting a recovered ciphertext ct using the secret key $sk_f$ to retrieve the message $\mu$, wherein correctness of the decryption is maintained for ciphertexts evaluated over an unbounded number of operations.

Preferably, the bootstrapping process utilizes FHEW bootstrapping techniques.

Preferably, the FHEW bootstrapping techniques comprise:

key switching, configured to convert an LWE encryption under a first secret key to an LWE encryption under a second secret key;

modulus switching, configured to convert an LWE encryption under a first modulus to an LWE encryption under a second modulus; and a homomorphic accumulator, configured to process GSW ciphertexts.

Preferably, the bootstrapping process performs a logical NAND operation, and further comprises:

performing a homomorphic addition on first and second LWE ciphertext components $(a^{(1)},b^{(1)})$ and $(a^{(2)},b^{(2)})$, under a secret key s and a plaintext modulus t=4, to generate a summed LWE ciphertext component (a, b) that encrypts a sum of plaintext messages $\mu^{(1)}+\mu^{(2)}$, wherein the homomorphic addition increases an associated error bound to q/8; and applying a mapping function $f$ to a value $x=b-\langle a, s\rangle$ of the summed LWE ciphertext component (a, b) via a homomorphic accumulator using a bootstrapping key btk and a key switching key ksk, wherein the mapping function $f$ is configured to transform:

$$x \text{ to } q/8, \text{ if } x \in \left[-q/8, 3q/8\right); \text{ and}$$

$$x \text{ to } -q/8, \text{ if } x \in \left[3q/8, 7q/8\right);$$

whereby the mapped value reflects a result of the NAND operation $\mu^{(1)}\text{NAND}\mu^{(2)}$ with an associated error bound reduced to $q/16$, wherein q is the ciphertext modulus.

Preferably, the auxiliary recovery key $\text{ark}_f$ is configured to recover a bootstrapped ciphertext from an expanded key form to a functional ciphertext form compatible with a decryption or homomorphic evaluation algorithm, and wherein:

the auxiliary recovery key $\text{ark}_f$ comprises a matrix structured as:

$$ark_f = \begin{bmatrix} M_1 & 0_{2m \times m} \\ M_2 & I_{m \times m} \end{bmatrix} \in \mathbb{Z}_q^{3m \times (2mmd+m)}$$

where, $M_1 = [A|B_f]^T E_1 + E_2$, $M_2 = U^T E_1 + E_3 - P2(\overline{R}_f)^T$, $E_1$ is a randomly chosen matrix uniformly sampled from $\mathbb{Z}_q$, $E_2$ and $E_3$ are error matrices sampled from an error distribution $\chi$ with bound $B_\chi$, A, $B_f$, U are public parameter matrices defined in the system, with $$A \in \mathbb{Z}_q^{n \times m}, B_f \in \mathbb{Z}_q^{n \times m} \text{ and } U \in \mathbb{Z}_q^{n \times m},$$

$\hat{R}_f$ is an expanded key matrix after bootstrapping, and recovering the bootstrapped ciphertext involves computing the functional ciphertext form $$\hat{ct}_f^{(g)}$$

via the matrix multiplication:

$$\hat{ct}_f^{(g)} = ark_f \cdot \begin{bmatrix} G^{-1}(\overline{c}_f) \\ \overline{c}_{out} \end{bmatrix}$$

where $\overline{c}_f$ and $\hat{c}_{out}$ are components of the bootstrapped ciphertext in the expanded key form, with $$\overline{c}_f \in \mathbb{Z}_q^{2mm}, \overline{c}_{out} \in \mathbb{Z}_q^m,$$

$G^{-1}$ is the inverse algorithm of the gadget matrix G, which decomposes a vector into a binary representation;

the functional ciphertext form $$\hat{ct}_f^{(g)}$$

after recovery has an associated error term with a bound less than $q/16$, where q is the ciphertext modulus, thereby enabling correct decryption and further homomorphic evaluation for unbounded-depth circuits without exceeding the error tolerance; and the auxiliary recovery key $\text{ark}_f$ is utilized within an Eval.NAND algorithm to restore ciphertexts after homomorphic evaluation of a NAND gate, enabling their use in subsequent unbounded-depth circuit evaluations.

Preferably, the homomorphic evaluation comprises the Eval.NAND algorithm, and the bootstrapping process is performed on each component of a message vector, wherein:

the Eval.NAND algorithm operates on functioned ciphertexts $$\hat{ct}_f^{(i)} = \left(\hat{c}_f^{(i)}, c_{out}^{(i)}\right) \in \mathbb{Z}_q^{3m} \text{ for } i \in \{1, 2\},$$

each encrypting a message vector $$\mu^{(j)} = \left(\mu_1^{(j)}, \dots, \mu_m^{(j)}\right) \in \{0, 1\}^m \text{ for } j \in \{1, 2\},$$

and comprises:
computing a homomorphic addition $$a = \hat{c}_f^{(1)} + \hat{c}_f^{(2)} \in \mathbb{Z}_q^{2m}, b = (b_1, \dots, b_m) = c_{out}^{(1)} + c_{out}^{(2)} \in \mathbb{Z}_q^m;$$

for each component $i \in [m]$, performing a bootstrapping process $$\overline{c}_i = \left(\overline{a}_i, \overline{b}_i\right) \leftarrow \text{Bootstrap}_{(NAND)}\left(btk_{r_i}, ksk_{r_i}, (a, b_i)\right) \in LWE_{r_i}^{4/q}\left(\mu_i^{(1)} \overline{\wedge} \mu_i^{(2)}, \delta\right),$$

where $btk_{r_i}$ is a bootstrapping key and $ksk_{r_i}$ is a key-switching key associated with a secret key component $r_i$;

the bootstrapping process is performed independently for each component $i \in [m]$, resulting in a bootstrapped ciphertext $\overline{ct} = (\overline{c}_f, \overline{c}_{out})$ with $$\overline{c}_f = [\overline{a}_1| \dots |\overline{a}_m] \in \mathbb{Z}_q^{2mm} \text{ and } \overline{c}_{out} = \left(\overline{b}_1, \dots, \overline{b}_m\right) \in \mathbb{Z}_q^m,$$

wherein the error bound for each component satisfies $\delta \leq q/16$; and the component-wise bootstrapping enables parallel processing and maintains an overall error bound below $q/16$, supporting correct decryption and further homomorphic evaluation for unbounded-depth circuits.

Preferably, the system is configured to, during the generation of the public parameters in the Setup algorithm and/or during the homomorphic evaluation process in the Eval algorithm, select parameters that satisfy predefined error bounds to maintain correctness of the encryption scheme, wherein the error bound for fresh ciphertexts is given by $$B_\chi + 2m\sigma(\alpha_{\mathcal{F}} + 1)B_\chi < \frac{q}{8},$$

where $B_\chi$ is the bound of the error distribution $\chi$, $\sigma$ is the key sampling parameter used in the SampleD algorithm for generating secret keys, $\alpha_{\mathcal{F}} = (m+1)^{d_{\mathcal{F}}}$ is a policy depth factor with $d_{\mathcal{F}}$ being the maximum depth of supported policy circuits, m is the dimension parameter such that m=$\Theta$(n log q), and q is the ciphertext modulus, the chosen parameters, with overwhelming probability, satisfies $$\left\| e_{out}^{(i)} - R_f^T \left[ e_{in}^{(i)} \mid e_f^{(i)} \right] \right\| < B_\chi + 2m\sigma(\alpha_{\mathcal{F}} + 1)B_\chi < \frac{q}{16}$$

for any fresh ciphertext; and
the error bound for evaluated ciphertexts is given by $$2m^2 d \cdot B_X + \delta + 2m\sigma \cdot 2m^2 d_g \cdot \alpha_{\mathcal{F}} B_X < \frac{q}{16},$$

where $d_g = \lceil \log_{B_g} q \rceil$ is the gadget base decomposition dimension with $B_g$ being a gadget base, $\sigma$ represents an error bound introduced during the bootstrapping process;
satisfying these error bounds allows the system to maintain correctness for homomorphic evaluations of circuits with unbounded depth, without requiring circuit-depth-dependent parameter scaling.

Preferably, the ciphertext $ct_x$ for a message $\mu \in \{0,1\}^m$ associated with an attribute vector $$x = (x_1, \ldots, x_l) \in \mathbb{Z}_q^l$$

comprises components $ct_x = (c_{in}, c_1, \ldots, c_l, c_{out})$ and wherein:
parameters and matrices are defined with dimensions:

$$A \in \mathbb{Z}_q^{n \times m}, B_i \in \mathbb{Z}_q^{n \times m} \text{ for } i \in [l], U \in \mathbb{Z}_q^{n \times m}, \text{ and } G \in \mathbb{Z}_q^{n \times m}$$

is a gadget matrix, wherein the ciphertext vector overall belongs to $$\mathbb{Z}_q^{(l+2)m},$$

and m=$\Theta$(n$\lceil$log q$\rceil$) as per the Setup algorithm;
the mathematical forms and dimensions of the ciphertext components are:

$$c_{in} = A^T s + e_{in} \in \mathbb{Z}_q^m, \text{ where } s \in \mathbb{Z}_q^n$$

is a random vector;
for each i$\in$[l], $$c_i = (B_i + x_i G)^T s + e_i^T \in \mathbb{Z}_q^m;$$

$$c_{out} = u^T s + e_{out} + \lfloor q/4 \rfloor \cdot \mu \in \mathbb{Z}_q^m,$$

where $\mu$ is encoded coordinate-wise;
error distributions and bounds: the vectors $e_{in}$, $e_i$ for i$\in$[l] and $e_{out}$ are independently sampled from an error distribution $\chi$ with a constant bound $B_\chi$ such that $\|e_{in}\|_\infty \leq B_\chi$, $\|e_i\|_\infty \leq B_\chi$, and $\|e_{out}\|_\infty \leq B_\chi$, wherein parameter selection during Setup and Eval ensures this bound for correctness;
attribute association: for each i$\in$[l], the component $c_i$ embeds the attribute $x_i$ directly, enabling subsequent key-homomorphic evaluation algorithms KeyEval$_{ct}$ or KeyEval$_D$ to process access-controlled information based on x;
KeyEval$_{ct}$ result and error bound: for a policy $f$ and attribute x, $$KeyEval_{ct}\left(f, x, \{B_i, c_i\}_{i=1}^l\right) \to c_f = D_{f,x}^T \cdot [c_1 \| \ldots \| c_l] \in \mathbb{Z}_q^m,$$

and $c_f = [B_f + f(x)G]^T \cdot s + e_f$, where $\|e_f\|_\infty \leq (m+1)^{d_{\mathcal{F}}}$. B with $d_{\mathcal{F}}$ being the depth of the policy circuit $f$, ensuring that the functioned ciphertext construction supports correct Eval and decryption.

According to another aspect, the present disclosure provides a computer-implemented system for unbounded multi-hop attribute-based fully homomorphic proxy re-encryption (AB-FHPRE), comprising:
a processor configured to execute instructions; and
a memory coupled to the processor and storing instructions configured to cause the processor to perform operations comprising:
generating public parameters including matrices A, $B_1$, . . . , $B_l$, U, and Gadget matrix G, and a master secret key msk;
generating a secret key $sk_f$ for a first access policy $f_1$ and an associated public key $pk_f$, wherein the associated public key $pk_f$ includes an auxiliary recovery key $ark_f$ for the first access policy $f_1$;
encrypting an attribute vector $$x \in \mathbb{Z}_q^l$$

and a message $\mu \in (0,1)^m$ associated with the first access policy $f_1$ into a ciphertext ct;
generating a re-encryption key $rek_{f_1 \to f_2}$ for transforming the ciphertext ct from the first access policy $f_1$ to a second access policy $f_2$, wherein the re-encryption key $rek_{f_1 \to f_2}$ is a matrix that combines policy-associated matrices and error matrices, enabling a proxy computing device to convert ciphertexts associated with the first access policy $f_1$ to those associated with the second access policy $f_2$ without accessing plaintext; and
re-encrypting, by the proxy computing device, the ciphertext from the first access policy $f_1$ to the second access policy $f_2$ using the re-encryption key $rek_{f_1 \to f_2}$ and a public key of the second policy, wherein the re-encryption comprises:
transforming the ciphertext under the first access policy $f_1$ into an intermediate re-encrypted ciphertext; and
performing a homomorphic AND computation on the intermediate re-encrypted ciphertext, wherein the homomorphic AND computation includes a bootstrapping process to refresh noise and produce a re-encrypted ciphertext for the second access policy $f_2$, and wherein the re-encryption supports an unbounded number of re-encryption hops.

Preferably, the re-encryption key is generated by the ReKeyGen algorithm and used by the ReEnc algorithm to re-encrypt a ciphertext under policy $f_1$ to a ciphertext under policy $f_2$, and wherein:

the re-encryption key $rek_{f_1 \to f_2}$ is a block matrix structured as:

$$rek_{f_1 \to f_2} = \begin{bmatrix} M_1^{(r)} & 0_{2m \times m} \\ M_2^{(r)} & I_{m \times m} \end{bmatrix} \in \mathbb{Z}_q^{3m \times (2m \cdot d + m)}$$

where $d = \lceil \log_{B_g} q \rceil$ is the decomposition length determined by a gadget base $B_g$, and $m = \Theta(n \log q)$ is the dimension parameter;

the components $$M_1^{(r)} \text{ and } M_2^{(r)}$$

are constructed as follows:
select an attribute vector $$y = (y_1, \dots, y_l) \in \mathbb{Z}_q^l$$

such that $f_2(y) = 0$;
construct an intermediate matrix $$\bar{M}_1^{(r)} = [A \mid B_1 + y_1 G \mid \dots \mid B_l + y_l G]^T E_1^{(r)} + \bar{E}_1^{(r)}, \text{ where } E_1^{(r)} \overset{\$}{\leftarrow} \mathbb{Z}_q^{n \times 2md}$$

is a random matrix, $$\bar{E}_2^{(r)} \leftarrow \chi^{(l+1)m \times 2md}$$

is an error matrix sampled from distribution $\chi$ with bound $B_\chi$;
evaluate $D_{f_2,y} \leftarrow \text{KeyEval}_D(f_2, y, (B_1, \dots, B_l))$, and compute:

$$M_1^{(r)} = \begin{bmatrix} I_{m \times m} & 0_{m \times m} \\ 0_{lm \times m} & D_{f_{2,y}} \end{bmatrix}^T \cdot \bar{M}_1^{(r)} = [A \mid B_{f_2}]^T E_1^{(r)} + E_2^{(r)} \text{ where } E_2^{(r)}$$

is an error matrix satisfying $\|E_2\|_\infty < \alpha_{\mathcal{F}} \cdot B_\chi$, $\alpha_{\mathcal{F}} = (m+1)^{d_{\mathcal{F}}}$ is a policy depth factor with $d_{\mathcal{F}}$ being the maximum depth of supported policies;
compute $$M_2^{(r)} = U^T E_1^{(r)} + E_3^{(r)} - P2(R_{f_1})^T, \text{ where } E_3^{(r)} \leftarrow \chi^{m \times 2md}$$

is an error matrix, $$R_{f_1} \in \mathbb{Z}_q^{2m \times m}$$

is the secret key for policy $f_1$, P2 is a public algorithm such that $P2(X) = G^T X$ for any matrix X;

the ReEnc algorithm uses $rek_{f_1 \to f_2}$ and the gadget inverse to compute a 1-hop re-encrypted ciphertext:

$$\bar{ct}_{f_2}^{(r)} = rek_{f_1 \to f_2} \cdot \begin{bmatrix} G^{-1}(\hat{c}_{f_1}) \\ c_{out} \end{bmatrix} \text{ where } \hat{c}_{f_1} \in \mathbb{Z}_q^{2m} \text{ and } c_{out} \in \mathbb{Z}_q^{m}$$

are components of the input functioned ciphertext under $f_1$, and $G^{-1}$ is the gadget inverse algorithm satisfying $G \cdot G^{-1}(x) = x$;

perform homomorphic AND computation on $$\bar{ct}_{f_2}^{(r)}$$

and itself:

$$\hat{ct}_{f_2}^{(r)} \leftarrow Eval. \text{ AND } (pp, pk_{f_2}, \bar{ct}_{f_2}^{(r)}, \bar{ct}_{f_2}^{(r)})$$

where Eval.AND consists of a simple addition and a boostrapping algorithm (i.e., $\text{Bootstrap}_{(AND)}$) ober the re-encrypted ciphertext $$\bar{ct}_{f_2}^{(r)}$$

and itself, and it outputs a ciphertext $$\hat{ct}_{f_2}^{(r)}$$

preserving the same message but with a lower error state; the matrices and error terms are sampled with respect to public parameters pp including modulus q, gadget matrix G, error distribution $\chi$, and bound $B_\chi$ such that the accumulated error after re-encryption satisfies $\|error\|_\infty < q/16$, enabling correct decryption; subsequently, a homomorphic refresh operation reduces the error to a level suitable for further re-encryption or homomorphic evaluation, thereby supporting multi-hop re-encryption with unbounded hops;

the re-encryption key $rek_{f_1 \to f_2}$ is generated by ReKeyGen using the master secret key $sk_{f_1}$ and public parameters pp, and consumed by ReEnc in conjunction with the public key $pk_{f_2}$ to map ciphertexts from policy $f_1$ to policy $f_2$.

According to another aspect, the present disclosure provides a computer-implemented method for unbounded depth fully homomorphic attribute-based encryption (FHABE), the method comprising:

generating, by a computing device, public parameters including matrices A, $B_1, \dots, B_l$, U, and Gadget matrix G, and a master secret key $msk = T_A$;

generating, by the computing device, a secret key $sk_f$ for an access policy $f$ and an associated public key $pk_f$, wherein the associated public key $pk_f$ includes an auxiliary recovery key arks;

encrypting, by the computing device, an attribute vector $x \in$ $$ \mathbb{Z}_q^l $$

and a message $\mu \in (0,1)^m$ associated with the access policy $f$ into a ciphertext ct;

homomorphically evaluating, by the computing device, an operation on one or more of the attribute-based ciphertexts to produce an evaluated ciphertext, wherein the homomorphic evaluation comprises:

performing a homomorphic arithmetic or logical operation on ciphertext components to achieve a resulting ciphertext component;

performing a bootstrapping process on the resulting ciphertext component, wherein the bootstrapping process is configured to refresh noise associated with the resulting ciphertext component; and applying the auxiliary recovery key $ark_f$ to a noise-refreshed ciphertext component to recover the evaluated ciphertext to a standard form compatible with subsequent homomorphic evaluation or decryption; and decrypting the ciphertext ct using the secret key $sk_f$ to retrieve the message $\mu$, wherein correctness of the decryption is maintained for ciphertexts evaluated over an unbounded number of operations.

Preferably, the bootstrapping process utilizes FHEW bootstrapping techniques.

Preferably, the FHEW bootstrapping techniques comprise:

key switching, configured to convert an LWE encryption under a first secret key to an LWE encryption under a second secret key;

modulus switching, configured to convert an LWE encryption under a first modulus to an LWE encryption under a second modulus; and a homomorphic accumulator, configured to process GSW ciphertexts.

Preferably, the bootstrapping process performs a logical NAND operation, and further comprises:

performing a homomorphic addition on first and second LWE ciphertext components $(a^{(1)}, b^{(1)})$ and $(a^{(2)}, b^{(2)})$, under a secret key s and a plaintext modulus t=4, to generate a summed LWE ciphertext component (a, b) that encrypts a sum of plaintext messages $\mu^{(1)} + \mu^{(2)}$, wherein the homomorphic addition increases an associated error bound to q/8; and applying a mapping function $f$ to a value $x = b - \langle a, s \rangle$ of the summed LWE ciphertext component (a, b) via a homomorphic accumulator using a bootstrapping key btk and a key switching key ksk, wherein the mapping function $f$ is configured to transform:

$$ x \text{ to } q/8, \text{ if } x \in [-q/8, 3q/8); \text{ and} $$

$$ x \text{ to} - q/8, \text{ if } x \in [3q/8, 7q/8); $$

whereby the mapped value reflects a result of the NAND operation $\mu^{(1)} \text{NAND} \mu^{(2)}$ with an associated error bound reduced to q/16, wherein q is the ciphertext modulus.

Preferably, the auxiliary recovery key $ark_f$ is configured to recover a bootstrapped ciphertext from an expanded key form to a functional ciphertext form compatible with a decryption or homomorphic evaluation algorithm, and wherein:

the auxiliary recovery key $ark_f$ comprises a matrix structured as:

$$ ark_f = \begin{bmatrix} M_1 & 0_{2m \times m} \\ M_2 & I_{m \times m} \end{bmatrix} \in \mathbb{Z}_q^{3m \times (2mmd+m)} $$

where, $M_1 = [A|B_f]^T E_1 + E_2$, $M_2 = U^T E_1 + E_3 - P2(\overline{R}_f)^T$, $E_1$ is a randomly chosen matrix uniformly sampled from $\mathbb{Z}_q$, $E_2$ and $E_3$ are error matrices sampled from an error distribution $\chi$ with bound $B_\chi$, A, $B_f$, U are public parameter matrices defined in the system, with $$ A \in \mathbb{Z}_q^{n \times m}, B_f \in \mathbb{Z}_q^{n \times m} \text{ and } U \in \mathbb{Z}_q^{n \times m}, $$

$\overline{R}_f$ is an expanded key matrix after bootstrapping, and recovering the bootstrapped ciphertext involves computing the functional ciphertext form $$ \widehat{ct}_f^{(g)} $$

via the matrix multiplication:

$$ \widehat{ct}_f^{(g)} = ark_f \cdot \begin{bmatrix} G^{-1}(\overline{c}_f) \\ \overline{c}_{out} \end{bmatrix} $$

where $\overline{c}_f$ and $\overline{c}_{out}$ are components of the bootstrapped ciphertext in the expanded key form, with $$ \overline{c}_f \in \mathbb{Z}_q^{2mm}, \overline{c}_{out} \in \mathbb{Z}_q^m, $$

$G^{-1}$ is the inverse algorithm of the gadget matrix G, which decomposes a vector into a binary representation;

the functional ciphertext form $$ \widehat{ct}_f^{(g)} $$

after recovery has an associated error term with a bound less than q/16, where q is the ciphertext modulus, thereby enabling correct decryption and further homomorphic evaluation for unbounded-depth circuits without exceeding the error tolerance; and the auxiliary recovery key $ark_f$ is utilized within an Eval.NAND algorithm to restore ciphertexts after homomorphic evaluation of a NAND gate, enabling their use in subsequent unbounded-depth circuit evaluations.

Preferably, the homomorphic evaluation comprises the Eval.NAND algorithm, and the bootstrapping process is performed on each component of a message vector, wherein:

the Eval.NAND algorithm operates on functioned ciphertexts $$ \widehat{ct}_f^{(i)} = (\widehat{c}_f^{(i)}, c_{out}^{(i)}) \in \mathbb{Z}_q^{3m} \text{ for } i \in \{1, 2\}, $$

each encrypting a message vector $$\mu^{(j)} = \left(\mu_1^{(j)}, \ldots, \mu_m^{(j)}\right) \in \{0,1\}^m \text{ for } j \in \{1,2\},$$

and comprises:
computing a homomorphic addition $$a = \hat{c}_f^{(1)} + \hat{c}_f^{(2)} \in \mathbb{Z}_q^{2m}, b = (b_1, \ldots, b_m) = c_{out}^{(1)} + c_{out}^{(2)} \in \mathbb{Z}_q^m;$$

for each component $i \in [m]$, performing a bootstrapping process $\overline{c}_i = (\overline{a}_i, \overline{b}_i) \leftarrow \text{Bootstrap}_{(NAND)}(btk_{r_i}, ksk_{r_i}, (a, b_i)) \in$ $$LWE_{r_i}^{4/q}\left(\mu_i^{(1)} \overline{\wedge} \mu_i^{(2)}, \delta\right),$$

where $btk_{r_i}$ is a bootstrapping key and $ksk_{r_i}$ is a key-switching key associated with a secret key component $r_i$;
the bootstrapping process is performed independently for each component $i \in [m]$, resulting in a bootstrapped ciphertext $\overline{ct} = (\hat{c}_f, \overline{c}_{out})$ with $$\overline{c}_f = [\overline{a}_1 \mid \ldots \mid \overline{a}_m] \in \mathbb{Z}_q^{2mm} \text{ and } \overline{c}_{out} = (\overline{b}_1, \ldots, \overline{b}_m) \in \mathbb{Z}_q^m,$$

wherein the error bound for each component satisfies $\delta \le q/16$; and
the component-wise bootstrapping enables parallel processing and maintains an overall error bound below $q/16$, supporting correct decryption and further homomorphic evaluation for unbounded-depth circuits.

Preferably, the system is configured to, during the generation of the public parameters in the Setup algorithm and/or during the homomorphic evaluation process in the Eval algorithm, select parameters that satisfy predefined error bounds to maintain correctness of the encryption scheme, wherein
the error bound for fresh ciphertexts is given by $$B_\chi + 2m\sigma(\alpha_{\mathcal{F}} + 1)B_\chi < \frac{q}{8},$$

where $B_\chi$ is the bound of the error distribution $\chi$, $\sigma$ is the key sampling parameter used in the SampleD algorithm for generating secret keys, $\alpha_F = (m+1)^{d_{\mathcal{F}}}$ is a policy depth factor with $d_{\mathcal{F}}$ being the maximum depth of supported policy circuits, $m$ is the dimension parameter such that $m = \Theta(n \log q)$, and $q$ is the ciphertext modulus, the chosen parameters, with overwhelming probability, satisfies $$\left\|e_{out}^{(i)} - R_f^T\left[e_{in}^{(i)} \mid e_f^{(i)}\right]\right\| < B_\chi + 2m\sigma(\alpha_{\mathcal{F}} + 1)B_\chi < \frac{q}{16}$$

for any fresh ciphertext; and the error bound for evaluated ciphertexts is given by $$2m^2 d \cdot B_X + \delta + 2m\sigma \cdot 2m^2 d_g \cdot \alpha_{\mathcal{F}} B_X < \frac{q}{16},$$

where $d_g = \lceil \log_{B_g} q \rceil$ is the gadget base decomposition dimension with $B_g$ being a gadget base, $\sigma$ represents an error bound introduced during the bootstrapping process;
satisfying these error bounds allows the system to maintain correctness for homomorphic evaluations of circuits with unbounded depth, without requiring circuit-depth-dependent parameter scaling.

Preferably, the ciphertext $ct_x$ for a message $\mu \in \{0,1\}^m$ associated with an attribute vector $$x = (x_1, \ldots, x_l) \in \mathbb{Z}_q^l$$

comprises components $ct_x = (c_{in}, c_1, \ldots, c_l, c_{out})$ and wherein:
parameters and matrices are defined with dimensions:

$$A \in \mathbb{Z}_q^{n \times m}, B_i \in \mathbb{Z}_q^{n \times m} \text{ for } i \in [l], U \in \mathbb{Z}_q^{n \times m}, \text{ and } G \in \mathbb{Z}_q^{n \times m}$$

is a gadget matrix, wherein the ciphertext vector overall belongs to $$\mathbb{Z}_q^{(l+2)m},$$

and $m = \Theta(n\lceil \log q \rceil)$ as per the Setup algorithm;
the mathematical forms and dimensions of the ciphertext components are:

$$c_{in} = A^T s + e_{in} \in \mathbb{Z}_q^m, \text{ where } s \in \mathbb{Z}_q^n$$

is a random vector;
for each $i \in [l]$, $$c_i = (B_i + x_i G)^T s + e_i^T \in \mathbb{Z}_q^m;$$

$$c_{out} = U^T s + e_{out} + \lfloor q/4 \rfloor \cdot \mu \in \mathbb{Z}_q^m,$$

where $\mu$ is encoded coordinate-wise;
error distributions and bounds: the vectors $e_{in}$, $e_i$ for $i \in [l]$ and $e_{out}$ are independently sampled from an error distribution $\chi$ with a constant bound $B_\chi$ such that $\|e_{in}\|_\infty \le B_\chi$, $\|e_i\|_\infty \le B_\chi$, and $\|e_{out}\|_\infty \le B_\chi$, wherein parameter selection during Setup and Eval ensures this bound for correctness;
attribute association: for each $i \in [l]$, the component $c_i$ embeds the attribute $x_i$ directly, enabling subsequent key-homomorphic evaluation algorithms $\text{KeyEval}_{ct}$ or $\text{KeyEval}_D$ to process access-controlled information based on x;

KeyEval$_{c_t}$ result and error bound: for a policy $f$ and attribute x, $$KeyEval_{c_t}\big(f,\, x,\, \{B_i,\, c_i\}_{i=1}^l\big) \rightarrow c_f = D_{f,x}^T \cdot [c_1\| \; \dots \; \|c_l] \in \mathbb{Z}_q^m,$$

and $c_f = [B_f + f(x)G]^T \cdot s + e_f$, where $\|e_f\|_\infty \leq (m+1)^{d_{\mathcal{F}}} \cdot B$ with $d_{\mathcal{F}}$ being the depth of the policy circuit $f$, ensuring that the functioned ciphertext construction supports correct Eval and decryption.

BRIEF DESCRIPTION OF THE DRAWINGS

FIG. 2 illustrates a flowchart detailing the computer-implemented method for fully homomorphic attribute-based encryption (FHABE) with unbounded circuit depth, performed by the system described in FIG. 1.

DETAILED DESCRIPTION OF THE EMBODIMENTS

Figure 1:
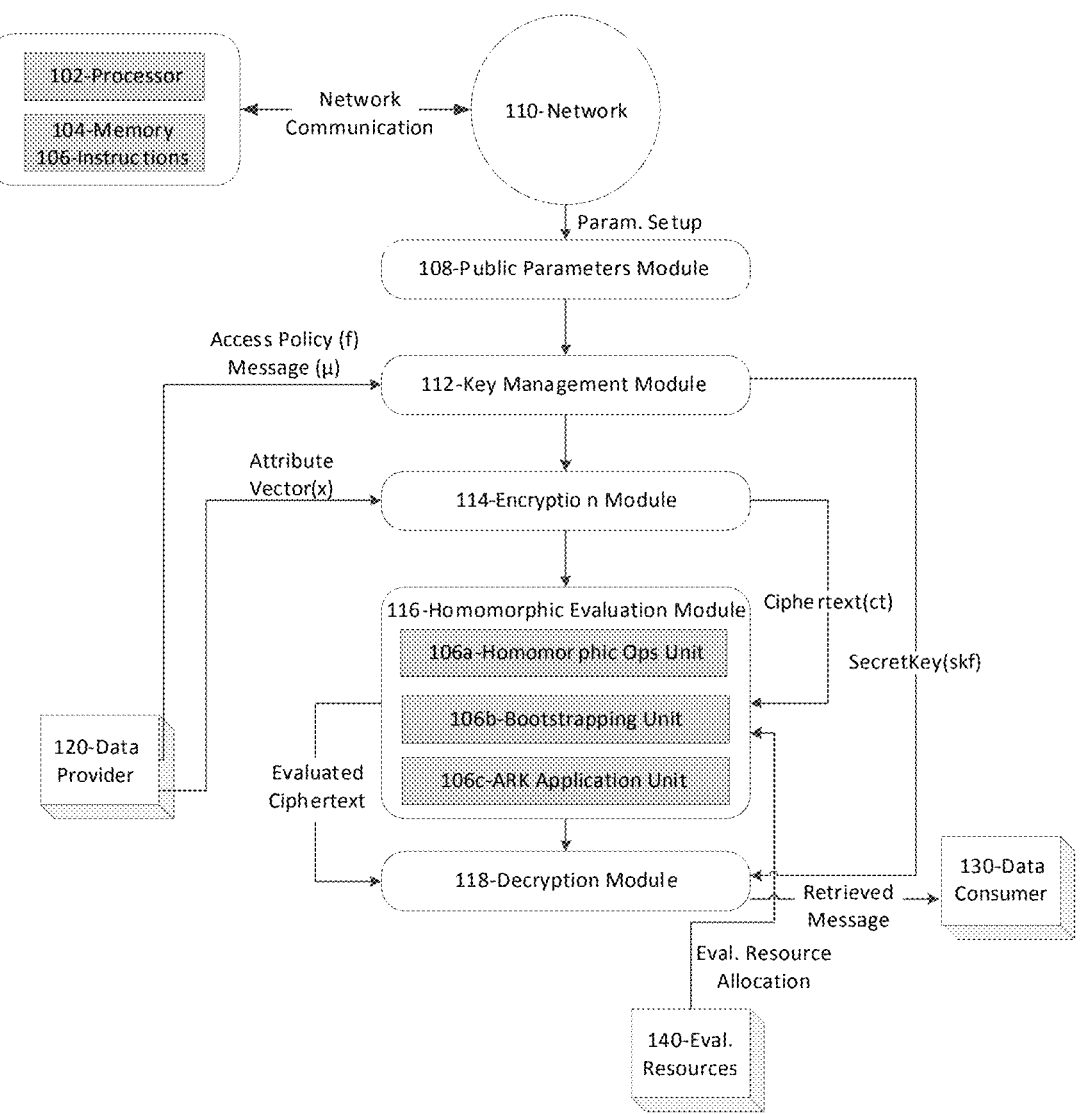
FIG. 1 illustrates a block diagram of a computer-implemented fully homomorphic attribute-based encryption (FHABE) system according to an embodiment of the present disclosure.
Figure 3:
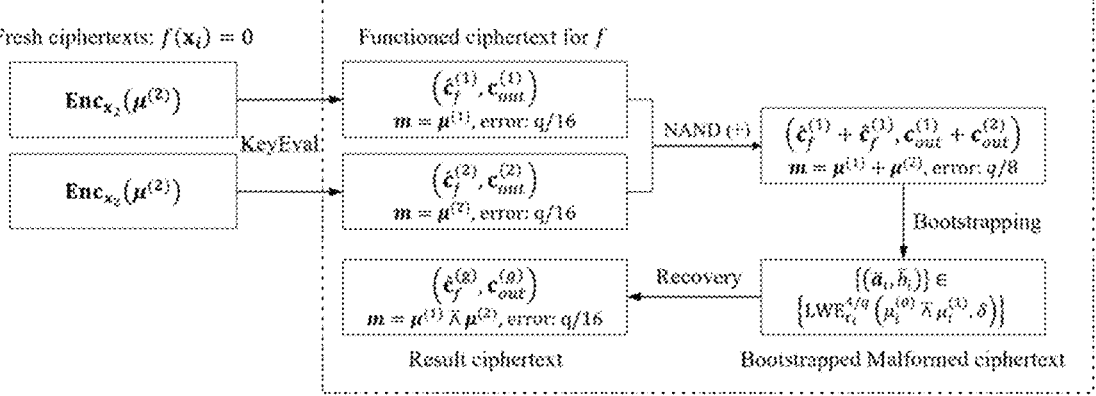
FIG. 3 is a cycle for a simple homomorphic NAND gate evaluation of FHABE.

The present invention provides systems and methods for a fully homomorphic attribute-based encryption (FHABE) scheme with unbounded circuit depth and an attribute-based fully homomorphic proxy re-encryption (AB-FHPRE) scheme. These innovations address significant technical challenges in secure data processing, particularly the limitations of prior art homomorphic encryption and attribute-based encryption schemes with respect to bounded circuit depth, ciphertext explosion, and restricted re-encryption capabilities. The detailed embodiments described herein are fully implementable on computer systems and provide tangible improvements in computational efficiency, data storage, and network transmission.

I. Overview of the Technical Problem and Solution

Traditional attribute-based encryption (ABE) schemes offer fine-grained access control but lack the ability to perform computations on encrypted data. Conversely, traditional fully homomorphic encryption (FHE) schemes allow arbitrary computations on encrypted data but generally lack fine-grained access control and often suffer from significant ciphertext expansion and limitations on circuit depth. Previous efforts to combine these technologies, such as certain homomorphic attribute-based encryption (HABE) schemes, typically impose restrictions on the circuit depth that can be homomorphically evaluated, or lead to substantial ciphertext sizes, making them impractical for real-world applications requiring complex and scalable computations. The core technical problem addressed by the present disclosure is to provide a comprehensive cryptographic framework that simultaneously supports:

1. Unbounded circuit depth homomorphic computations: Enabling arbitrary and complex operations on encrypted data without prior decryption.

2. Fine-grained attribute-based access control: Allowing data access based on specific attributes and policies.

3. Efficient ciphertext management: Minimizing ciphertext size to optimize storage, transmission, and computation.

4. Secure and multi-hop proxy re-encryption: Facilitating dynamic and granular data sharing in untrusted environments.

The present disclosure overcomes these technical problems by integrating advanced FHE-based bootstrapping techniques with a novel attribute-based encryption framework. A key technical feature is the introduction of an auxiliary recovery key (ARK) that facilitates the recovery of bootstrapped ciphertext components into a standard, functional form, thereby allowing for subsequent evaluations and decryption irrespective of the computation depth. Furthermore, the invention achieves lightweight ciphertexts through specific vector encryption constructions, which significantly reduces the size of encrypted data per message bit. This crucial optimization directly addresses a practical bottleneck in prior art FHE systems, enhancing feasibility in environments with limited storage and bandwidth, and underscores the invention's tangible technical improvement on existing computer systems.

II. Computer-Implemented FHABE System Architecture

FIG. 1 illustrates a block diagram of a computer-implemented fully homomorphic attribute-based encryption (FHABE) system 100 according to an embodiment of the present disclosure. The system 100 is configured to perform operations including key generation, encryption, homomorphic evaluation, and decryption, leveraging distributed computing resources and secure network communication. The system 100 comprises, or is implemented upon, a computing device that includes a processor 102 and a memory 104 coupled to the processor 102. The memory 104 stores instructions 106 that, when executed by the processor 102, cause the processor to perform the various operations of the FHABE scheme. The system 100 interacts with external entities and components via a network 110, such as a local area network (LAN), wide area network (WAN), or the Internet. The processor 102 and memory 104 are intrinsically linked to the network 110 for communication, with instructions 106 guiding the processor's interactions over the network 110. Within the FHABE system 100, several functional modules are implemented as software instructions executed by the processor 102 and data stored in memory 104:

Public Parameters Module 108: This module is configured to generate public parameters for the FHABE scheme. These parameters typically include cryptographic matrices, such as A, and a Gadget matrix G, vital for the encryption and homomorphic operations. The public parameters are generally made available to all participants in the system. The generation of these parameters forms part of the Setup algorithm, as detailed in S11 and S12 in the fourth section-Technical Details below.

Key Management Module 112: This module is responsible for generating cryptographic keys. Based on a specific access policy $f$ provided by a data provider 120, this module generates a secret key sk$_f$ and an associated public key pk$_f$. A critical component of the public key pk$_f$ is the auxiliary recovery key ark$_f$, which is essential for enabling unbounded circuit depth by allowing the recovery of bootstrapped ciphertext components to standard form. This activity corresponds to the KeyGen algorithm described in S2 as detailed in the fourth section-Technical Details below, including steps S21 through S28.

Encryption Module 114: This module takes an attribute vector x and a message u associated with the access policy $f$. Using the public key $pk_f$, it encrypts these inputs into a ciphertext ct. The data provider 120 typically provides the message and attribute vector. The encryption process corresponds to the Encrypt algorithm, outlined in S3 as detailed in the fourth section-Technical Details below, specifically steps S31 through S33. A notable feature here is the lightweight ciphertext construction facilitated by vector encryption, which significantly reduces the ciphertext size compared to traditional FHE, improving storage and network efficiency.

Homomorphic Evaluation Module 116: This is a central module for enabling computations on encrypted data. It includes:

Homomorphic Operations Unit 116*a*: Configured to execute homomorphic arithmetic or logical operations (e.g., addition, multiplication, NAND gates) on ciphertext components.

Bootstrapping Unit 116*b*: Configured to perform a bootstrapping process on noise-affected ciphertext components. This unit implements the core mechanism for refreshing ciphertext noise, which is crucial for achieving unbounded circuit depth. This corresponds to the iterative steps mentioned in S4 as detailed in the fourth section-Technical Details below.

ARK Application Unit 116*c*: Configured to apply the auxiliary recovery key arks to noise-refreshed ciphertext components. This step ensures that the bootstrapped, but potentially non-standard, ciphertext is transformed back into a standard evaluated ciphertext that can be further evaluated or finally decrypted, thereby guaranteeing unbounded computation depth. This is a critical technical contribution enabling the "arbitrary computations" aspect of FHABE. The Homomorphic Evaluation Module 116 can utilize Evaluation Resources 140, represented as external computing power (e.g., cloud-based evaluation servers) connected via the network 110 to efficiently perform complex computations.

Decryption Module 118: This module is configured to decrypt an evaluated ciphertext using the corresponding secret key to retrieve the original message. This module is typically used by a data consumer 130 who possesses the appropriate secret key. This corresponds to the Decrypt algorithm in S5 as detailed in the fourth section-Technical Details below.

III. FHABE Method Flowchart

FIG. 2 illustrates a flowchart detailing the computer-implemented method for fully homomorphic attribute-based encryption (FHABE) with unbounded circuit depth, performed by the system described in FIG. 1.

The method begins with START and proceeds as follows:

S1: Generate Public Parameters and Master Secret Key. This initial setup step involves generating global cryptographic parameters and a master secret key. These parameters include matrices (e.g., A) and a Gadget matrix G, as well as a master key msk. This step corresponds to the Setup algorithm, specifically S1 detailed below S2: Generate Secret Key for Access Policy Public Key, and Auxiliary Recovery Key by Computing Device. On input of existing public parameters, the master secret key msk, and an access policy circuit $f$, a computing device generates a secret key $sk_f$ and an associated public key $pk_f$. Crucially, the public key pks includes an auxiliary recovery key $ark_f$. This step encapsulates the KeyGen algorithm described in S2 detailed below, where S21 evaluates basis, S22 computes elements, S23 samples distribution for error, S24 defines elements through secret components, S25 computes key switch keys, S26 constructs and selects attribute vectors, S27 evaluates and computes ARK, and S28 outputs the keys.

S3: Encrypt Attribute Vector & Message into Ciphertext. An attribute vector x and a message μ are encrypted into a ciphertext ct using the public key $pk_f$. This ciphertext ct is notable for its lightweight construction. This efficiency is a concrete technical improvement. This step corresponds to the Encrypt algorithm, S3 as detailed below, specifically S31 through S33 of choosing random vectors, matrices, and sampling errors.

S4: Homomorphically Evaluate Operation to Produce Evaluated Ciphertext. This is the core homomorphic computation phase, which operates on one or more ciphertexts. This step is designed to achieve unbounded circuit depth capability. It comprises three sub-steps:

S41: Perform Homomorphic Arithmetic/Logical Operation on Ciphertext Components. The system performs operations (e.g., Eval.NAND for a NAND gate) directly on the encrypted ciphertext.

S42: Perform Bootstrapping Process on Resulting Ciphertext Component for Noise Refresh. After each homomorphic operation (or a series of operations), the noise in the ciphertext component accumulates. The bootstrapping process is applied to refresh this noise without decrypting the data, ensuring that further computations remain possible.

S43: Apply Auxiliary Recovery Key to Noise-Refreshed Ciphertext Component to Recover Evaluated Ciphertext to Standard Form Compatible with Eval/Decrypt (Preserving Unbounded Circuit Depth). This is a critical distinguishing feature. The bootstrapped ciphertext component, while noise-refreshed, might not be in a standard, immediately usable form for subsequent evaluations or decryption. The auxiliary recovery key that was generated in S2 is specifically used here to transform the noise-refreshed component back into a standard evaluated ciphertext. This recovery mechanism is what ensures that the system can support an effectively unbounded number of homomorphic operations without requiring circuit-depth-dependent parameter scaling, which is a major advancement over prior art.

S50: Decrypt Evaluated Ciphertext Using Secret Key to Retrieve Message. If the access policy $f$ associated with the secret key $sk_f$ is satisfied by the attributes underlying the evaluated ciphertext, the message μ can be successfully retrieved.

IV. Technical Details

The core steps of the FHABE includes system setup, key generation, encryption, decryption and homomorphic evaluation are described in detail below.

Further, the parameters involved in the present disclosure are described in the present embodiment below.

For a family of policy circuits $$\mathcal{F} = f : \mathbb{Z}_q^l \to \mathbb{Z}_q$$

with a depth bound $d_F$, and a security parameter $\lambda$, our construction is parameterized by: $n=poly(\lambda)$, $q=2^d$. Let $m=\Theta(n \log q)$, $\alpha_F=(m+1)^{d_F}$, $$G \in \mathbb{Z}_q^{n \times m}$$

be a Gadget matrix, and $\chi$ be a $B_\chi$-bounded error distribution so that the DLW $E_{n,g,\chi}$ problem is hard. Set $\sigma=\omega(\alpha_F \sqrt{\log m})$ where $\alpha_F > \sqrt{n \log mn}$ for the correctness of the trapdoor algorithms. For the RLWE encryption in bootstrapping, set the RLWE modulus $$Q = B_g^{d_g}$$

for some base $B_g$, and $N=q/2$ as the dimension. Choose a bootstrapping base $B_r$ and a key switching base $B_{ks}$. Let $\overline{\chi}$ be an error distribution of parameter $\sigma$ such that the RLW $E_{N,Q,\overline{\chi}}$ problem is hard. Let $pp^{LWE}=(n, m, q, \chi, \sigma)$ and $pp^{RLWE}=N$, $Q$, $B_g$, $B_r$, $B_{ks}$, $\overline{\chi}$, $\overline{\sigma}$.

For the message space $\mathcal{M} =\{0,1\}^m$, the method of the present embodiment specifically includes the steps as follows.

S1. Setup($1^\lambda$, $1^l$)$\rightarrow$(pp, msk). Input the security parameter $\lambda$ and attribute length l, the setup generates public parameter sets pp and the master key msk as follow:

S11. Generate $(A, T_A)\leftarrow$TrapGen($1^n$, $1^m$, q), where $$A \in \mathbb{Z}_q^{n \times m} \text{ and } T_A \in \mathbb{Z}_q^{m \times m}$$

is a basis of $$\left(\Lambda_q^\perp(A)\right);$$

S12. Choose l+1 random matrices $$\left(B_1, \dots , B_l, U \triangleq \mathbb{Z}_q^{n \times m}\right).$$

Output the public parameter pp=($pp^{LWE}$, $pp^{RLWE}$, A, $B_1$, . . ., $B_l$, U, G) and the master secret key msk=$T_A$.

S2. KeyGen (pp, msk, $f$)$\rightarrow$($pk_f$, $sk_f$): On input the public parameters pp, the master secret key msk, and an access policy circuit $f$, the key generation algorithm outputs the key pair ($pk_f$, $sk_f$) with policy $f$ do as follows:

S21. Evaluate $B_f\leftarrow$KeyEval$_{pk}(f, B_1, \dots, B_l)$;

S22. Compute $T_{[A|B_f]}\leftarrow$ExtendRight(A, $T_A$, $B_f$);

S23. Sample $R_f\leftarrow$SampleD(A|$B_f$, $T_{[A|B_f]}$, U, $\sigma$), such that $[A|B_f]R_f=U$;

S24. Let $$R_f = [r_1 \mid \dots \mid r_m] \in \mathbb{Z}_q^{2m \times m} \text{ where } r_i \in \mathbb{Z}_q^{2m} \text{ for } i \in [m],$$

compute:

$$btk_f = \left(btk_{r_k}\right)_{k=1}^m \text{ where } btk_{r_k} = \left(\mathbb{Z}_{h,i,j}^{(k)} = RGSW_z\left(X^{h \cdot r_k[i] \cdot B_i^j}\right)\right)$$

for some secret for some secret $z\leftarrow\mathcal{R}_Q$, $h\in[0, B_r-1]$, $i\in[2]$, $j\in[0, d_r-1]$, $d_r=\lceil \log_{B_r} q\rceil$;

S25. Compute key switch key $$ksk_f = \left(ksk_{r_k}\right)_{k=1}^m \text{ where } ksk_{r_k} = \left(k_{h,i,j}^{(k)} = LWE_{r_k}^{q/Q}\left(hz_i' B_{ks}^j\right)\right)$$

for $z'=(z_0, -z_{N-1}, \dots, -z_1)$, $h\in[0, B_{ks}-1]$, $i\in[N]$, $j\in[0, d_{ks}-1]$, and $d_{ks}=\lceil \log_{B_{ks}} q\rceil$;

S26. Construct $$R_f = \begin{bmatrix} r_1 & 0 & \dots & 0 \\ 0 & r_2 & \dots & 0 \\ \vdots & \vdots & \ddots & \vdots \\ 0 & 0 & \dots & r_m \end{bmatrix} \in \mathbb{Z}_q^{2m \cdot m \times m}$$

Then select any attribute vector $$x' = (x_1', \dots, x_l') \in \mathbb{Z}_q^l$$

such that $f(x')=0$. Construct $M_1=[A|B_1+x_1'G| \dots |B_l+x_l'G]^T E_1+E_2$ and $M_2=U^T E_1+E_3-P2(R_f)^T$, where $$E_1 \xleftarrow{\$} \mathbb{Z}_q^{n \times 2mmd}, E_2 \leftarrow \chi^{(l+1)m \times 2mmd},$$

and $E_3\leftarrow\chi^{m \times 2mmd}$.

S27. Evaluate $D_{f,x'}\leftarrow$KeyEval$_D(f,x', (B_1, \dots, B_l))$. Then compute the auxiliary recovery key $$ark_f = \begin{bmatrix} M_1 & 0_{2m \times m} \\ M_2 & I_{m \times m} \end{bmatrix} \in \mathbb{Z}_q^{3m \times (2mmd+m)}, \text{ where } \begin{bmatrix} I_{m \times m} & 0_{m \times m} \\ 0_{m \times m} & D_{f,x'} \end{bmatrix}^T.$$

$M_1=[A|B_f]^T E_1+E_2$, for some $\|E_2\|_\infty < \alpha_F \cdot B_\chi$;

S28. Output the secret key $sk_f=R_f$ and public key $pk_f=$ ($btk_f$, $ksk_f$, $ark_f$).

S3. Enc (pp,x,$\mu$)$\rightarrow ct_x$: On input an attribute vector $$x \in \mathbb{Z}_q^l$$

and a message $\mu\in(0,1)^m$, the encryption algorithm outputs the ciphertext ct do as follows:

S31. Choose a vector $$\left(s \xleftarrow{\$} \mathbb{Z}_q^n\right)$$

at uniformly random;

S32. Choose 1 matrices $$\left(S_i \xleftarrow{\$} (1, -1)^{m \times m}\right)$$

for (i∈[l]) at uniformly random;

S33. Sample errors ($e_0$, $e_{out} \leftarrow \chi^m$) and compute $$e = [I_m | S_1 | \, \ldots \, | S_l]^T \cdot e_0 = (e_{in}, e_1, \ldots, e_l) \in \mathbb{Z}_q^{(l+1)m};$$

S34. Construct $$H_x = [A | B_1 + x_1 G | \, \cdots \, | B_l + x_l G] \in \mathbb{Z}_q^{n \times (l+1)m};$$

S35. Compute $$c = H_x^T s + e \in \mathbb{Z}_q^{(l+1)m} \text{ and } c_{out} = U^T s + e_{out} + \lfloor q/4 \rfloor \cdot \mu \in \mathbb{Z}_q^m.$$

Let c=($c_{in}$, $c_1$, . . . , $c_l$) for $c_{in}=A^T s+e_{in}$, $c_i=(B_i+x_i G)^T s+e_i$;

S36. Output the ciphertext $$ct_x = (c_{in}, c_1, \ldots, c_l, c_{out}) \in \mathbb{Z}_q^{(l+2)m}$$

along with the attribute vector X.

S4. Dec(pp, $sk_f$, ct)→$\mu$: On input a secret key $sk_f=R_f$ and a ciphertext ct, the decryption algorithm outputs the message do as follows based on different cases:

S41. If (ct) is a fresh ciphertext, let ct be $ct_x=(c_{in}, c_1, \ldots, c_l, c_{out})$, output ⊥ if $f(x)≠0$; Otherwise, evaluate $$KeyEval_{ct}\left(f, x, (B_i, c_i)_{i=1}^l\right) \rightarrow c_f = [B_f + f(x)G]^T \cdot s + e_f,$$

$$\text{where } \left(e_f = D_{f,x}^T \cdot [e_1 \| \, \cdots \, \| e_l]\right).$$

Then construct the functioned ciphertext $$\hat{ct}_f = (\hat{c}_f, c_{out}) \in \mathbb{Z}_q^{3m},$$

$$\text{where } \hat{c}_f = [c_{in} \| c_f] = [A \, | \, B_f + f(x)G]^T s + [e_f \| e_f] \in \mathbb{Z}_q^{2m};$$

S42. If ct is an evaluated ciphertext under $f$, let ct be $$\left(\hat{ct}^{(g)} = (\hat{c}_f, c_{out}) \in \mathbb{Z}_q^{3m};\right.$$

S43. Output $\mu=\lfloor (4/q)(c_{out}-R_f \cdot \hat{c}_f) \rfloor$ mod 4, where $\mu \in \{0, 1\}^m$.

For the homomorphic evaluation algorithm Eval, we describe the NAND gate computation Eval.NAND here.

S5. Eval.NAND(pp, $pk_f$, $ct^{(1)}$, $ct^{(2)}$)→$\hat{ct}^{(g)}$: On input a $pk_f$ and two fresh or evaluated ciphertexts, $ct^{(1)}$ that is an encryption of $$\mu^{(1)} = \left(\mu_1^{(1)}, \cdots, \mu_m^{(1)}\right),$$

and $ct^{(2)}$ that is an encryption of $$\mu^{(2)} = \left(\mu_1^{(2)}, \ldots, \mu_m^{(2)}\right),$$

the homomorphic evaluation outputs a ciphertext that is an encryption of NAND($\mu^{(1)}$, $\mu^{(2)}$) do as follow:

S51. For each i∈(1,2), if $ct^{(i)}$ is a fresh ciphertext, let it be $$ct_x^{(i)} = \left(c_{in}^{(i)}, c_1^{(i)}, \ldots, c_l^{(i)}, c_{out}^{(i)}\right),$$

which satisfies $f(x^{(i)})=0$, evaluate $$c_f^{(i)} \leftarrow KeyEval_{ct}\left(f, x^{(i)}, \{B_j, c_j^{(i)}\}_{j=1}^l\right),$$

construct $$\left(\hat{c}_f^{(i)} = [c_{in}^{(i)} \| c_f^{(i)}] \in \mathbb{Z}_q^{2m}\right).$$

It $ct^{(i)}$ is an evaluated ciphertext under $f$, let $$ct^{(i)} = \left(\hat{c}_f^{(i)}, c_{out}^{(i)}\right).$$

Then construct the functioned ciphertext $$\hat{c}_f^{(i)}, c_{out}^{(i)} \in \mathbb{Z}_q^{3m}$$

for i∈(1,2);

S52. Now we have $$\hat{ct}^{(1)} = \left(\hat{c}_f^{(1)}, c_{out}^{(1)}\right), \text{ and } \hat{ct}^{(2)} = \left(\hat{c}_f^{(2)}, c_{out}^{(2)}\right).$$

Compute $$a = \hat{c}_f^{(1)} + \hat{c}_f^{(2)} \in \mathbb{Z}_q^{2m}, b = (b_1, \ldots, b_m) = c_{out}^{(1)} + c_{out}^{(2)} \in \mathbb{Z}_q^m;$$

S53. For each i∈[m], implement the bootstrapping $$\bar{c}_1 = (\bar{a}_1, \bar{b}_i) \leftarrow \text{Bootstrap}_{(NAND)}\left(btk_{r_i}, ksk_{r_i}, (a, b_i)\right) \in LWE_{r_i}^{q/4}\left(\mu_i^{(1)} \barwedge \mu_i^{(2)}, \delta\right)$$

holding $$\left(\bar{a}_1 \in \mathbb{Z}_q^{2m}\right)$$

and ($\hat{b}_i \in \mathbb{Z}_q$) with error bound $\delta$;

S54. Construct $$\left(\overline{c}_f = [\overline{a}_1 \| \dots \| \overline{a}_m] \in \mathbb{Z}_q^{2m \cdot m}\right) \text{ and } \left(\overline{c}_{out} = (\overline{b}_1, \dots, \overline{b}_m) \in \mathbb{Z}_q^m\right);$$

S55. Compute $$\widehat{\mathrm{ct}}_f^{(g)} = ark_f \cdot \left[\frac{G^{-1}(\overline{c}_f)}{\overline{c}_{out}}\right]$$

and output $$\widehat{\mathrm{ct}}_f^{(g)} = \left(\hat{c}_f^{(g)}, c_{out}^{(g)}\right) \in \mathbb{Z}_q^{3m}.$$

The ciphertext structure of the present FHABE embodiment is lightweight, with the size of a single-message ciphertext only being O(1 log q), outperforming existing similar schemes. Further, the present FHABE embodiment satisfies selective IND-CPA security.

We also present an embodiment of the unbounded multi-hop AB-FHPRE, which serves as an extension of our unbounded FHABE into the proxy re-encryption setting.

Attribute-based PRE (AB-PRE) is a generalization of PRE, enabling fine-grained access control on both ciphertext and delegation. Specifically, (key-policy) AB-PRE allows a proxy to transform ciphertexts under some policy $f_1$, to ciphertexts under another policy $f_2$, realizing many-to-many encrypted data sharing.

An unbounded multi-hop AB-FHPRE scheme extends the algorithms of the FHABE=(Setup, KeyGen, Enc, Dec, Eval) scheme mentioned above by incorporating two additional algorithms, ReKeyGen and ReEnc, defined as follows:

S6. ReKeyGen (pp, $sk_{f_1}$, $f_1$, $f_2$)$\rightarrow rek_{f_1 \rightarrow f_2}$: On input a secret key $sk_{f_1}$ and two policies, $f_1$, $f_2$. The re-encryption key generation algorithm outputs a re-encryption key $rek_{f_1 \rightarrow f_2}$ from $f_1$ to $f_2$ do as follows:

S61. Select an attribute vector $y=(y_1, \dots, y_l)$ such that $f_2$ $(y)=0$;

S62. Construct matrices $$\overline{M}_1^{(r)} = \left[A|B_1 + y_1 G| \dots |B_l + y_l G\right]^T E_1^{(r)} + \overline{E}_1^{(r)} \text{ and}$$

$$M_2 = U^T E_1^{(r)} + E_3^{(r)} - P2\left(R_{f_1}\right)^T,$$

where $E_1^{(r)} \overset{\$}{\leftarrow} \mathbb{Z}_q^{n \times 2md}$, $E_2^{(r)} \leftarrow \chi^{(l+1)m \times 2md}$, and $$E_3^{(r)} \leftarrow \chi^{m \times 2md};$$

S63. Evaluate $D_{f_2,y} \leftarrow KeyEval_D(f_2, y, (B_1, \dots, B_l))$ and compute $$M_1^{(r)} = \left[\begin{matrix} I_{m \times m} & 0_{m \times m} \\ 0_{lm \times m} & D_{f_2,y} \end{matrix}\right]^T \cdot \overline{M}_1^{(r)} = \left[A|B_{f_2}\right]^T E_1^{(r)} + E_2^{(r)},$$

for some error $$E_2^{(r)}$$

satisfying $\|E_2\|_\infty < \alpha_{\mathcal{F}} \cdot B_\chi$;

S64. Output the re-encryption key:

$$rek_{f_1 \rightarrow f_2} = \left[\begin{matrix} M_1^{(r)} & 0_{2m \times m} \\ M_2^{(r)} & I_{m \times m} \end{matrix}\right].$$

The ReKeyGen algorithm is run by the delegator, and the output will be sent to the proxy.

S7. ReEnc (pp, $rek_{f_1 \rightarrow f_2}$, $pk_{f_2}$, ct)$\rightarrow \widehat{ct}_{f_2}$: On input a re-encryption key $rek_{f_1 \rightarrow f_2}$, a public key $pk_{f_2}$, and a ciphertext ct, outputs a ciphertext associated with $f_2$ do as follows:

S71. If ct is a fresh ciphertext under x, as $ct_x=(c_{in}, c_1, \dots, c_l, c_{out})$, output $\bot$ if $f_1(x) \neq 0$; Otherwise, evaluate $$c_{f_1} \leftarrow KeyEval_{ct}\left(f_1, x, \{B_i, c_i\}_{i=1}^l\right)$$

and construct the functioned ciphertext $$\widehat{ct}_{f_1} = \left(\hat{c}_{f_1}, c_{out}\right) \in \mathbb{Z}_q^{3m},$$

where $\hat{c}_{f_1}=[c_{in}|c_{f_1}]$; If ct is an evaluated or re-encrypted ciphertext for $f$, output $\bot$ if $f \neq f_1$; Otherwise, let ct be $\widehat{ct}_{f_1} = (\hat{c}_{f_1}=[c_{in}|c_{f_1}], c_{out})$;

S72. Compute the 1-hop re-encrypted ciphertext $$\overline{ct}_{f_2}^{(r)} = rek_{f_1 \rightarrow f_2} \cdot \left[\frac{G^{-1}\left(\hat{c}_{f_1}\right)}{c_{out}}\right];$$

S73. Output the final ciphertext $$\widehat{ct}_{f_2}^{(r)} \leftarrow Eval. \text{ AND}\left(pp, pk_{f_2}, \overline{ct}_{f_2}^{(r)}, \overline{ct}_{f_2}^{(r)}\right).$$

The present AB-FHPRE embodiment satisfies selective IND-HRA security.

Hereinafter, we introduce more details about the FHEW bootstrapping. The bootstrapping process within the Homomorphic Evaluation Module utilizes advanced FHEW (Fully Homomorphic Encryption over the Weaker assumption) bootstrapping techniques. This integration is crucial for reducing the accumulated error of intermediate ciphertexts to a bounded value, typically denoted as $B_{boot}$, thereby enabling subsequent homomorphic computations and achieving unbounded circuit depth. The FHEW bootstrapping framework, as adapted here, primarily comprises three interconnected techniques: key switching, modulus switching, and homomorphic accumulator.

For the key switching: this technique is configured to convert an LWE (Learning With Errors) encryption under a first secret key $s_1$ to an LWE encryption under a second secret key $s_2$. In homomorphic evaluation, intermediate ciphertexts might result from computations involving different internal keys or representations. Key switching allows for the efficient transformation of such ciphertexts under an "old" key to a "new" key, usually a simpler or refreshed key, without decrypting the underlying message. This is typically achieved by encrypting the "old" secret key under the "new" public key and using this encryption to re-encrypt the original ciphertext. For an LWE ciphertext (a, b) encrypting a message m under secret key $s_1$, key switching aims to produce (a', b') encrypting m under $s_2$. This process involves a key switching key $ksk_{s_1 \to s_2}$ that bundles encryptions of elements of $s_1$ under $s_2$. The operation usually involves decomposing basis elements and sums, such that the resulting ciphertext still resembles an LWE encryption with bounded noise. This conversion is vital for standardizing ciphertexts during complex evaluations.

For modulus switching: this technique is configured to convert an LWE encryption under a first modulus $q_1$ to an LWE encryption under a second, smaller modulus $q_2$, where $q_2 < q_1$. Homomorphic operations cause noise to grow multiplicatively. To manage this noise and keep ciphertext components within manageable bounds, their coefficients often need to be reduced. Modulus switching helps to scale down the ciphertext components and their associated noise, effectively "compressing" the ciphertext and its error term. While reducing the modulus, the underlying plaintext message, appropriately scaled, must be preserved. This is performed by multiplying the ciphertext elements by $q_2/q_1$ and then rounding the result. However, care must be taken as this process slightly increases the noise, which is then managed by the subsequent bootstrapping steps. The ability to reduce the ciphertext modulus without compromising security or correctness is essential for controlling noise and maintaining efficiency.

Homomorphic Accumulator: The homomorphic accumulator is configured to process GSW (Gentry-Sahai-Waters) ciphertexts. In the context of FHEW bootstrapping, LWE ciphertexts encrypting single bits are often converted into GSW-like ciphertexts to perform homomorphic evaluations of lookup tables. The accumulator essentially evaluates a decryption circuit homomorphically. It takes an LWE ciphertext (which can be viewed as an encryption of a point value) and homomorphically evaluates a polynomial that decrypts this point to recover the underlying message bit. This process typically involves converting the LWE ciphertext into a more structured GSW-like ciphertext through a "gadget" matrix. The homomorphic accumulator then performs additions and multiplications of these GSW ciphertexts to implement the decryption process, effectively evaluating the "key" (secret key) as a polynomial within the encrypted domain. The output is a new LWE ciphertext, usually with a refreshed, smaller noise bound, encrypting the original message bit. This step often uses a dedicated "test polynomial" or "functional bootstrapping" approach to homomorphically recover the message bit and re-encrypt it with less noise.

By combining these three techniques, the Bootstrapping Unit efficiently refreshes the noise in a ciphertext component, reducing it to a controlled, bounded value $B_{boot}$. This renewed ciphertext component then becomes suitable for further homomorphic operations or, critically, for recovery by the ARK Application Unit to its standard form, ensuring the system's capacity for unbounded circuit depth. The integration of the FHEW framework significantly enhances the practicality and security of the FHABE scheme provided by the present disclosure.

While the present invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. The detailed description provided herein represents the best mode of practicing the invention as currently contemplated by the inventors, and variations and adaptations that would be apparent to those skilled in the art are intended to be included within the scope of the invention.

What is claimed is:

1. A computer-implemented system for fully homomorphic attribute-based encryption (FHABE) with unbounded circuit depth, comprising:

a processor configured to execute instructions; and a memory coupled to the processor and storing instructions configured to cause the processor to perform operations comprising:

generating public parameters including matrices A, $B_1, \ldots, B_l$, U and Gadget matrix $G = I_n \otimes g^T$, and a master secret key msk;

generating a secret key $sk_f$ for an access policy $f$ and an associated public key $pk_f$, wherein the associated public key $pk_f$ includes an auxiliary recovery key $ark_f$;

encrypting an attribute vector $$x \in \mathbb{Z}_q^l$$

and a message $\mu \in (0,1)^m$ associated with the access policy $f$ into a ciphertext $ct_x$;

homomorphically evaluating an operation on one or more of the ciphertexts to produce an evaluated ciphertext, wherein the homomorphic evaluation comprises:

performing a homomorphic arithmetic or logical operation on ciphertext components to achieve a resulting ciphertext component;

performing a bootstrapping process on the resulting ciphertext component, wherein the bootstrapping process is configured to refresh noise associated with the resulting ciphertext component; and applying the auxiliary recovery key $ark_f$ to a noise-refreshed ciphertext component to recover the evaluated ciphertext to a standard form compatible with subsequent homomorphic evaluation or decryption; and decrypting a recovered ciphertext ct using the secret key $sk_f$ to retrieve the message $\mu$, wherein correctness of the decryption is maintained for ciphertexts evaluated over an unbounded number of operations.

2. The system of claim 1, wherein the bootstrapping process utilizes FHEW bootstrapping techniques.

3. The system of claim 2, wherein the FHEW bootstrapping techniques comprise:

key switching, configured to convert an LWE encryption under a first secret key to an LWE encryption under a second secret key;

modulus switching, configured to convert an LWE encryption under a first modulus to an LWE encryption under a second modulus; and a homomorphic accumulator, configured to process GSW ciphertexts.

4. The system of claim 3, wherein the bootstrapping process performs a logical NAND operation, and further comprises:

performing a homomorphic addition on first and second LWE ciphertext components $(a^{(1)}, b^{(1)})$ and $(a^{(2)}, b^{(2)})$, under a secret key s and a plaintext modulus t=4, to generate a summed LWE ciphertext component (a, b) that encrypts a sum of plaintext messages $\mu^{(1)} + \mu^{(2)}$, wherein the homomorphic addition increases an associated error bound to q/8; and applying a mapping function $f$ to a value $x = b - \langle a, s \rangle$ of the summed LWE ciphertext component (a, b) via a homomorphic accumulator using a bootstrapping key btk and a key switching key ksk, wherein the mapping function $f$ is configured to transform:

$$x \text{ to } q/8, \text{ if } x \in [-q/8, 3q/8);$$

$$\text{and}$$

$$x \text{ to } -q/8, \text{ if } x \in [3q/8, 7q/8);$$

whereby the mapped value reflects a result of the NAND operation $\mu^{(1)} \text{NAND} \mu^{(2)}$ with an associated error bound reduced to q/16, wherein q is the ciphertext modulus.

5. The system of claim 1, wherein the auxiliary recovery key $\text{ark}_f$ is configured to recover a bootstrapped ciphertext from an expanded key form to a functional ciphertext form compatible with a decryption or homomorphic evaluation algorithm, and wherein:

the auxiliary recovery key arks comprises a matrix structured as:

$$ark_f = \begin{bmatrix} M_1 & 0_{2m \times m} \\ M_2 & I_{m \times m} \end{bmatrix} \in \mathbb{Z}_q^{3m \times (2mmd+m)}$$

where, $M_1 = [A|B_f]^T E_1 + E_2$, $M_2 = U^T E_1 + E_3 - P2(\hat{R}_f)^T$, $E_1$ is a randomly chosen matrix uniformly sampled from $\mathbb{Z}_q$, $E_2$ and $E_3$ are error matrices sampled from an error distribution $\chi$ with bound $B_\chi$, A, $B_f$, U are public parameter matrices defined in the system, with $$A \in \mathbb{Z}_q^{n \times m}, B_f \in \mathbb{Z}_q^{n \times m} \text{ and } U \in \mathbb{Z}_q^{n \times m},$$

$\overline{R}_f$ is an expanded key matrix after bootstrapping, and recovering the bootstrapped ciphertext involves computing the functional ciphertext form $$\hat{ct}_f^{(g)}$$

via the matrix multiplication:

$$\hat{ct}_f^{(g)} = ark_f \cdot \begin{bmatrix} G^{-1}(\overline{c}_f) \\ \overline{c}_{out} \end{bmatrix}$$

where $\overline{c}_f$ and $\overline{c}_{out}$ are components of the bootstrapped ciphertext in the expanded key form, with $$\overline{c}_f \in \mathbb{Z}_q^{2mm}, \overline{c}_{out} \in \mathbb{Z}_q^m,$$

$G^{-1}$ is the inverse algorithm of the gadget matrix G, which decomposes a vector into a binary representation;

the functional ciphertext form $$\hat{ct}_f^{(g)}$$

after recovery has an associated error term with a bound less than q/16, where q is the ciphertext modulus, thereby enabling correct decryption and further homomorphic evaluation for unbounded-depth circuits without exceeding the error tolerance; and the auxiliary recovery key $\text{ark}_f$ is utilized within an Eval.NAND algorithm to restore ciphertexts after homomorphic evaluation of a NAND gate, enabling their use in subsequent unbounded-depth circuit evaluations.

6. The system of claim 5, wherein the homomorphic evaluation comprises the Eval.NAND algorithm, and the bootstrapping process is performed on each component of a message vector, wherein:

the Eval.NAND algorithm operates on functioned ciphertexts $$\hat{ct}_f^{(i)} = \left( \hat{c}_f^{(i)}, c_{out}^{(i)} \right) \in \mathbb{Z}_q^{3m}$$

for $j \in \{1,2\}$, each encrypting a message vector $$\mu^{(j)} = \left( \mu_1^{(j)}, \ldots, \mu_m^{(j)} \right) \in \{0, 1\}^m$$

for $j \in \{1,2\}$, and comprises:

computing a homomorphic addition $$a = \hat{c}_f^{(1)} + \hat{c}_f^{(2)} \in \mathbb{Z}_q^{2m}, b = (b_1, \ldots, b_m) = c_{out}^{(1)} + c_{out}^{(2)} \in \mathbb{Z}_q^m;$$

for each component $i \in [m]$, performing a bootstrapping process $$\overline{c}_i = \left( \overline{a}_i, \overline{b}_i \right) \leftarrow \text{Bootstrap}_{(NAND)} \left( btk_{r_i}, ksk_{r_i}, (a, b_i) \right) \in LWE_{r_i}^{4/q} \left( \mu_i^{(1)} \overline{\wedge} \mu_i^{(2)}, \delta \right),$$

where $btk_{r_i}$ is a bootstrapping key and $ksk_{r_i}$ is a key-switching key associated with a secret key component $r_i$;

the bootstrapping process is performed independently for each component $i \in [m]$, resulting in a bootstrapped ciphertext $\overline{ct} = (\overline{c}_f, \overline{c}_{out})$ with $$\overline{c}_f = [\overline{a}_1 | \ldots | \overline{a}_m] \in \mathbb{Z}_q^{2mm} \text{ and } \overline{c}_{out} = \left( \overline{b}_1, \ldots, \overline{b}_m \right) \in \mathbb{Z}_q^m,$$

wherein the error bound for each component satisfies $\delta \leq q/16$; and the component-wise bootstrapping enables parallel processing and maintains an overall error bound below q/16, supporting correct decryption and further homomorphic evaluation for unbounded-depth circuits.

7. The system of claim 1, wherein the system is configured to, during the generation of the public parameters in the Setup algorithm and during the homomorphic evaluation process in the Eval algorithm, select parameters that satisfy predefined error bounds to maintain correctness of the encryption scheme, wherein the error bound for fresh ciphertexts is given by $$B_\chi + 2m\sigma(\alpha_{\mathcal{F}} + 1)B_\chi < \frac{q}{8},$$

where $B_\chi$ is the bound of the error distribution $\chi$, $\sigma$ is the key sampling parameter used in the SampleD algorithm for generating secret keys, $\alpha_{\mathcal{F}} = (m+1)^{d_{\mathcal{F}}}$ is a policy depth factor with $d_{\mathcal{F}}$ being the maximum depth of supported policy circuits, m is the dimension parameter such that $m = \Theta(n \log q)$, and q is the ciphertext modulus, the chosen parameters, with overwhelming probability, satisfies $$\left\|e_{out}^{(i)} - R_f^T[e_{in}^{(i)} | e_f^{(i)}]\right\| < B_\chi + 2m\sigma(\alpha_{\mathcal{F}} + 1)B_\chi < \frac{q}{16}$$

for any fresh ciphertext; and
the error bound for evaluated ciphertexts is given by $$2m^2 d \cdot B_X + \delta + 2m\sigma \cdot 2m^2 d_g \cdot \alpha_{\mathcal{F}} B_X < \frac{q}{16},$$

where $d_g = \lceil \log_{B_g} q \rceil$ is the gadget base decomposition dimension with $B_g$ being a gadget base, $\sigma$ represents an error bound introduced during the bootstrapping process;

satisfying these error bounds allows the system to maintain correctness for homomorphic evaluations of circuits with unbounded depth, without requiring circuit-depth-dependent parameter scaling.

8. The system of claim 1, wherein the ciphertext $ct_x$ for a message $\mu \in \{0,1\}^m$ associated with an attribute vector $$x = (x_1, \ldots, x_l) \in \mathbb{Z}_q^l$$

comprises components $ct_x = (c_{in}, c_1, \ldots, c_l, c_{out})$ and wherein:

parameters and matrices are defined with dimensions:

$$A \in \mathbb{Z}_q^{n \times m}, B_i \in \mathbb{Z}_q^{n \times m} \text{ for } i \in [l], U \in \mathbb{Z}_q^{n \times m}, \text{ and } G \in \mathbb{Z}_q^{n \times m}$$

is a gadget matrix, wherein the ciphertext vector overall belongs to $$\mathbb{Z}_q^{(l+2)m},$$

and $m = \Theta(n \lceil \log q \rceil)$ as per the Setup algorithm;
the mathematical forms and dimensions of the ciphertext components are:

$$c_{in} = A^T S + e_{in} \in \mathbb{Z}_q^m, \text{ where } s \in \mathbb{Z}_q^n$$

is a random vector;

for each $i \in [l]$, $$c_i = (B_i + x_i G)^T s + e_i^T \in \mathbb{Z}_q^m; c_{out} = U^T s + e_{out} + \lfloor q/4 \rfloor \cdot \mu \in \mathbb{Z}_q^m,$$

where $\mu$ is encoded coordinate-wise;
error distributions and bounds: the vectors $e_{in}$, $e_i$ for $i \in [l]$ and $e_{out}$ are independently sampled from an error distribution $\chi$ with a constant bound $B_\chi$ such that $\|e_{in}\|_\infty < B_\chi$, $\|e_i\|_\infty \le B_\chi$, and $\|e_{out}\|_\infty \le B_\chi$, wherein parameter selection during Setup and Eval ensures this bound for correctness;
attribute association: for each $i \in [l]$, the component $c_i$ embeds the attribute $x_i$ directly, enabling subsequent key-homomorphic evaluation algorithms $KeyEval_{ct}$ or $KeyEval_D$ to process access-controlled information based on x;
$KeyEval_{ct}$ result and error bound: for a policy $f$ and attribute x, $$KeyEval_{ct}(f, x, \{B_i, c_i\}_{i=1}^l) \rightarrow c_f = D_{f,x}^T \cdot [c_1 \| \ldots \| c_l] \in \mathbb{Z}_q^m,$$

and $c_f = [B_f + f(x) \ G]^T \cdot s + e_f$, where $\|e_f\|_\infty \le (m+1)^{d_{\mathcal{F}}} \cdot B$ with $d_{\mathcal{F}}$ being the depth of the policy circuit $f$, ensuring that the functioned ciphertext construction supports correct Eval and decryption.

9. A computer-implemented system for unbounded multi-hop attribute-based fully homomorphic proxy re-encryption (AB-FHPRE), comprising:
a processor configured to execute instructions; and
a memory coupled to the processor and storing instructions configured to cause the processor to perform operations comprising:
generating public parameters including matrices A, $B_1$, ..., $B_l$, U, and Gadget matrix G, and a master secret key msk;
generating a secret key $sk_f$ for a first access policy $f_1$ and an associated public key $pk_f$, wherein the associated public key $pk_f$ includes an auxiliary recovery key $ark_f$ for the first access policy $f_1$;
encrypting an attribute vector $$x \in \mathbb{Z}_q^l$$

and a message $\mu \in (0,1)^m$ associated with the first access policy $f_1$ into a ciphertext ct;
generating a re-encryption key $rek_{f_1 \rightarrow f_2}$ for transforming the ciphertext ct from the first access policy $f_1$ to a second access policy $f_2$, wherein the re-encryption key $rek_{f_1 \rightarrow f_2}$ is a matrix that combines policy-associated matrices and error matrices, enabling a proxy computing device to convert ciphertexts associated with the first access policy $f_1$ to those associated with the second access policy $f_2$ without accessing plaintext; and
re-encrypting, by the proxy computing device, the ciphertext from the first access policy $f_1$ to the second access policy $f_2$ using the re-encryption key $rek_{f_1 \rightarrow f_2}$ and a public key of the second policy, wherein the re-encryption comprises:

transforming the ciphertext under the first access policy $f_1$ into an intermediate re-encrypted ciphertext; and performing a homomorphic AND computation on the intermediate re-encrypted ciphertext, wherein the homomorphic AND computation includes a bootstrapping process to refresh noise and produce a re-encrypted ciphertext for the second access policy $f_2$, and wherein the re-encryption supports an unbounded number of re-encryption hops.

10. The system of claim 9, wherein the re-encryption key is generated by the ReKeyGen algorithm and used by the ReEnc algorithm to re-encrypt a ciphertext under policy $f_1$ to a ciphertext under policy $f_2$, and wherein:

the re-encryption key $\text{rek}_{f_1 \to f_2}$ is a block matrix structured as:

$$\text{rek}_{f_1 \to f_2} = \begin{bmatrix} M_1^{(r)} & 0_{2m \times m} \\ M_2^{(r)} & I_{m \times m} \end{bmatrix} \in \mathbb{Z}_q^{3m \times (2m \cdot d + m)}$$

where $d = \lceil \log_{B_g} q \rceil$ is the decomposition length determined by a gadget base $B_g$, and $m = \Theta(n \log q)$ is the dimension parameter;

the components $$M_1^{(r)} \text{ and } M_2^{(r)}$$

are constructed as follows:

select an attribute vector $$y = (y_1, \ldots, y_l) \in \mathbb{Z}_q^l$$

such that $f_2(y) = 0$;

construct an intermediate matrix $$\bar{M}_1^{(r)} = [A \mid B_1 + y_1 G \mid \ldots \mid B_l + y_l G]^T E_1^{(r)} + \bar{E}_1^{(r)},$$

$$\text{where } E_1^{(r)} \xleftarrow{\$} \mathbb{Z}_q^{n \times 2md}$$

is a random matrix, $$E_2^{(r)} \leftarrow \chi^{(l+1)m \times 2md}$$

is an error matrix sampled from distribution $\chi$ with bound $B_\chi$;

evaluate $D_{f_2,y} \leftarrow \text{KeyEval}_D(f_2, y, (B_1, \ldots, B_l))$, and compute:

$$M_1^{(r)} = \begin{bmatrix} I_{m \times m} & 0_{m \times m} \\ 0_{lm \times m} & D_{f_2,y} \end{bmatrix}^T \cdot \bar{M}_1^{(r)} = [A \mid B_{f_2}]^T E_1^{(r)} + E_2^{(r)}$$

$$\text{where } E_2^{(r)}$$

is an error matrix satisfying $\|E_2\|_\infty < \alpha_{\mathcal{F}} \cdot B_\chi$, $\alpha_{\mathcal{F}} = (m+1)^{d_{\mathcal{F}}}$ is a policy depth factor with $d_{\mathcal{F}}$ being the maximum depth of supported policies;

compute $$M_2^{(r)} = U^T E_1^{(r)} + E_3^{(r)} - P2(R_{f_1})^T, \text{ where } E_3^{(r)} \leftarrow \chi^{m \times 2md}$$

is an error matrix, $$R_{f_1} \in \mathbb{Z}_q^{2m \times m}$$

is the secret key tor policy $f_1$, P2 is a public algorithm such that $P2(X) = G^T X$ for any matrix X;

the ReEnc algorithm uses $\text{rek}_{f_1 \to f_2}$ and the gadget inverse to compute a 1-hop re-encrypted ciphertext $$\bar{ct}_{f_2}^{(r)} = \text{rek}_{f_1 \to f_2} \cdot \begin{bmatrix} G^{-1}(\hat{c}_{f_1}) \\ c_{out} \end{bmatrix}$$

$$\text{where } \hat{c}_{f_1} \in \mathbb{Z}_q^{2m} \text{ and } c_{out} \in \mathbb{Z}_q^m$$

are components of the input functioned ciphertext under $f_1$, and $G^{-1}$ is the gadget inverse algorithm satisfying $G \cdot G^{-1}(x) = x$;

the matrices and error terms are sampled with respect to public parameters pp including modulus q, gadget matrix G, error distribution $\chi$, and bound $B_\chi$ such that the accumulated error after re-encryption satisfies $\|\text{error}\|_\infty < q/16$, enabling correct decryption; subsequently, a homomorphic refresh operation reduces the error to a level suitable for further re-encryption or homomorphic evaluation, thereby supporting multi-hop re-encryption with unbounded hops;

the re-encryption key $\text{rek}_{f_1 \to f_2}$ is generated by ReKeyGen using the master secret key $\text{sk}_{f_1}$ and public parameters pp, and consumed by ReEnc in conjunction with the public key $\text{pk}_{f_2}$ to map ciphertexts from policy $f_1$ to policy $f_2$.

11. A computer-implemented method for unbounded depth fully homomorphic attribute-based encryption (FHABE), the method comprising:

generating, by a computing device, public parameters including matrices $A$, $B_1, \ldots, B_l$, $U$, and Gadget matrix $G$, and a master secret key $\text{msk} = T_A$;

generating, by the computing device, a secret key $\text{sk}_f$ for an access policy $f$ and an associated public key $\text{pk}_f$, wherein the associated public key $\text{pk}_f$ includes an auxiliary recovery key $\text{ark}_f$;

encrypting, by the computing device, an attribute vector $$x \in \mathbb{Z}_q^l$$

and a message $\mu \in (0,1)^m$ associated with the access policy $f$ into a ciphertext ct;

homomorphically evaluating, by the computing device, an operation on one or more of the attribute-based ciphertexts to produce an evaluated ciphertext, wherein the homomorphic evaluation comprises:

performing a homomorphic arithmetic or logical operation on ciphertext components to achieve a resulting ciphertext component;

performing a bootstrapping process on the resulting ciphertext component, wherein the bootstrapping process is configured to refresh noise associated with the resulting ciphertext component; and applying the auxiliary recovery key $ark_f$ to a noise-refreshed ciphertext component to recover the evaluated ciphertext to a standard form compatible with subsequent homomorphic evaluation or decryption; and decrypting the ciphertext ct using the secret key $sk_f$ to retrieve the message $\mu$, wherein correctness of the decryption is maintained for ciphertexts evaluated over an unbounded number of operations.

12. The method of claim 11, wherein the bootstrapping process utilizes FHEW bootstrapping techniques.

13. The method of claim 12, wherein the FHEW bootstrapping techniques comprise:

key switching, configured to convert an LWE encryption under a first secret key to an LWE encryption under a second secret key;

modulus switching, configured to convert an LWE encryption under a first modulus to an LWE encryption under a second modulus; and a homomorphic accumulator, configured to process GSW ciphertexts.

14. The method of claim 13, wherein the bootstrapping process performs a logical NAND operation, and further comprises:

performing a homomorphic addition on first and second LWE ciphertext components $(a^{(1)}, b^{(1)})$ and $(a^{(2)}, b^{(2)})$, under a secret key s and a plaintext modulus t=4, to generate a summed LWE ciphertext component (a, b) that encrypts a sum of plaintext messages $\mu^{(1)}+\mu^{(2)}$, wherein the homomorphic addition increases an associated error bound to q/8; and applying a mapping function $f$ to a value $x=b-\langle a, s\rangle$ of the summed LWE ciphertext component (a, b) via a homomorphic accumulator using a bootstrapping key btk and a key switching key ksk, wherein the mapping function $f$ is configured to transform:

$$x \text{ to } q/8, \text{ if } x \in [-q/8, 3q/8); \text{ and}$$
$$x \text{ to } -q/8, \text{ if } x \in [3q/8, 7q/8);$$

whereby the mapped value reflects a result of the NAND operation $\mu^{(1)}\text{NAND}\mu^{(2)}$ with an associated error bound reduced to q/16, wherein q is the ciphertext modulus.

15. The method of claim 11, wherein the auxiliary recovery key $ark_f$ is configured to recover a bootstrapped ciphertext from an expanded key form to a functional ciphertext form compatible with a decryption or homomorphic evaluation algorithm, and wherein:

the auxiliary recovery key ark comprises a matrix structured as:

$$ark_f = \begin{bmatrix} M_1 & 0_{2m \times m} \\ M_2 & I_{m \times m} \end{bmatrix} \in \mathbb{Z}_q^{3m \times (2mmd+m)}$$

where, $M_1=[A|B_f]^T E_1+E_2$, $M_2=U^T E_1+E_3-P2(\overline{R}_f)^T$, $E_1$ is a randomly chosen matrix uniformly sampled from $\mathbb{Z}_q$, $E_2$ and $E_3$ are error matrices sampled from an error distribution $\chi$ with bound $B_\chi$, A, $B_f$, U are public parameter matrices defined in the system, with $$A \in \mathbb{Z}_q^{n \times m}, B_f \in \mathbb{Z}_q^{n \times m} \text{ and } U \in \mathbb{Z}_q^{n \times m},$$

$R_f$ is an expanded key matrix after bootstrapping, and recovering the bootstrapped ciphertext involves computing the functional ciphertext form $$\widehat{ct}_f^{(g)}$$

via the matrix multiplication:

$$\widehat{ct}_f^{(g)} = ark_f \cdot \begin{bmatrix} G^{-1}(\overline{c}_f) \\ \overline{c}_{out} \end{bmatrix}$$

where $\overline{c}_f$ and $\overline{c}_{out}$ are components of the bootstrapped ciphertext in the expanded key form, with $$\overline{c}_f \in \mathbb{Z}_q^{2mm}, \overline{c}_{out} \in \mathbb{Z}_q^m,$$

$G^{-1}$ is the inverse algorithm of the gadget matrix G, which decomposes a vector into a binary representation;

the functional ciphertext form $$\widehat{ct}_f^{(g)}$$

after recovery has an associated error term with a bound less than q/16, where q is the ciphertext modulus, thereby enabling correct decryption and further homomorphic evaluation for unbounded-depth circuits without exceeding the error tolerance; and the auxiliary recovery key $ark_f$ is utilized within an Eval.NAND algorithm to restore ciphertexts after homomorphic evaluation of a NAND gate, enabling their use in subsequent unbounded-depth circuit evaluations.

16. The method of claim 15, wherein the homomorphic evaluation comprises the Eval.NAND algorithm, and the bootstrapping process is performed on each component of a message vector, wherein:

the Eval.NAND algorithm operates on functioned ciphertexts $$\widehat{ct}_f^{(i)} = (\hat{c}_f^{(i)}, c_{out}^{(i)}) \in \mathbb{Z}_q^{3m}$$

for $i \in \{1,2\}$, each encrypting a message vector $$\mu^{(j)} = (\mu_1^{(j)}, \ldots, \mu_m^{(j)}) \in \{0, 1\}^m$$

for $j \in \{1,2\}$, and comprises:

computing a homomorphic addition $$a = \hat{c}_f^{(1)} + \hat{c}_f^{(2)} \in \mathbb{Z}_q^{2m}, \; b = (b_1, \ldots, b_m) = c_{out}^{(1)} + c_{out}^{(2)} \in \mathbb{Z}_q^m;$$

for each component $i \in [m]$, performing a bootstrapping process $\overline{c}_i = (\overline{a}_i, \; \overline{b}_i) \leftarrow \mathrm{Bootstrap}_{(NAND)}(\mathrm{btk}_{r_i}, \; \mathrm{ksk}_{r_i}, \; (a, b_i)) \in$ $$LWE_{r_i}^{4/q}(\mu_i^{(1)} \overline{\wedge} \mu_i^{(2)}, \delta),$$

where $\mathrm{btk}_{r_i}$ is a bootstrapping key and $\mathrm{ksk}_{r_i}$ is a key-switching key associated with a secret key component $r_i$;

the bootstrapping process is performed independently for each component $i \in [m]$, resulting in a bootstrapped ciphertext $\overline{ct} = (\overline{c}_f, \overline{c}_{out})$ with $$\overline{c}_f = [\overline{a}_1 | \ldots | \overline{a}_m] \in \mathbb{Z}_q^{2mm} \text{ and } \overline{c}_{out} = (\overline{b}_1, \ldots, \overline{b}_m) \in \mathbb{Z}_q^m,$$

wherein the error bound for each component satisfies $\delta \le q/16$; and the component-wise bootstrapping enables parallel processing and maintains an overall error bound below $q/16$, supporting correct decryption and further homomorphic evaluation for unbounded-depth circuits.

17. The method of claim 11, wherein the system is configured to, during the generation of the public parameters in the Setup algorithm and during the homomorphic evaluation process in the Eval algorithm, select parameters that satisfy predefined error bounds to maintain correctness of the encryption scheme, wherein the error bound for fresh ciphertexts is given by $$B_\chi + 2m\sigma(\alpha_{\mathcal{F}} + 1)B_\chi < \frac{q}{8},$$

where $B_\chi$ is the bound of the error distribution $\chi$, $\sigma$ is the key sampling parameter used in the SampleD algorithm for generating secret keys, $\alpha_{\mathcal{F}} = (m+1)^{d_{\mathcal{F}}}$ is a policy depth factor with $d_{\mathcal{F}}$ being the maximum depth of supported policy circuits, m is the dimension parameter such that $m = \Theta(n \log q)$, and q is the ciphertext modulus, the chosen parameters, with overwhelming probability, satisfies $$\left\| e_{out}^{(i)} - R_f^T \left[ e_{in}^{(i)} \mid e_f^{(i)} \right] \right\| < B_\chi + 2m\sigma(\alpha_{\mathcal{F}} + 1)B_\chi < \frac{q}{16}$$

for any fresh ciphertext; and
the error bound for evaluated ciphertexts is given by $$2m^2 d \cdot B_\chi + \delta + 2m\sigma \cdot 2m^2 d_g \cdot \alpha_{\mathcal{F}} B_\chi < \frac{q}{16},$$

where $d_g = \lceil \log_{B_g} q \rceil$ is the gadget base decomposition dimension with $B_g$ being a gadget base, $\sigma$ represents an error bound introduced during the bootstrapping process;

satisfying these error bounds allows the system to maintain correctness for homomorphic evaluations of circuits with unbounded depth, without requiring circuit-depth-dependent parameter scaling.

18. The method of claim 11, wherein the ciphertext $\mathrm{ct}_x$ for a message $\mu \in \{0,1\}^m$ associated with an attribute vector $$x = (x_1, \ldots, x_l) \in \mathbb{Z}_q^l$$

comprises components $\mathrm{ct}_x = (c_{in}, c_1, \ldots, c_l, c_{out})$ and wherein:

parameters and matrices are defined with dimensions:

$$A \in \mathbb{Z}_q^{n \times m}, \; B_i \in \mathbb{Z}_q^{n \times m} \text{ for } i \in [l], \; U \in \mathbb{Z}_q^{n \times m}, \text{ and } G \in \mathbb{Z}_q^{n \times m}$$

is a gadget matrix, wherein the ciphertext vector overall belongs to $$\mathbb{Z}_q^{(l+2)m},$$

and $m = \Theta(n \lceil \log q \rceil)$ as per the Setup algorithm;
the mathematical forms and dimensions of the ciphertext components are:

$$c_{in} = A^T s + e_{in} \in \mathbb{Z}_q^m, \text{ where } s \in \mathbb{Z}_q^n$$

is a random vector;
for each $i \in [l]$, $$c_i = (B_i + x_i G)^T s + e_i^T \in \mathbb{Z}_q^m;$$

$$c_{out} = U^T s + e_{out} + \lfloor q/4 \rfloor \cdot \mu \in \mathbb{Z}_q^m,$$

where $\mu$ is encoded coordinate-wise;
error distributions and bounds: the vectors $e_{in}$, $e_i$ for $i \in [l]$ and $e_{out}$ are independently sampled from an error distribution $\chi$ with a constant bound $B_\chi$ such that $\|e_{in}\|_\infty \le B_\chi$, $\|e_i\|_\infty \le B_\chi$, and $\|e_{out}\|_\infty \le B_\chi$, wherein parameter selection during Setup and Eval ensures this bound for correctness;
attribute association: for each $i \in [l]$, the component $c_i$ embeds the attribute $x_i$ directly, enabling subsequent key-homomorphic evaluation algorithms $\mathrm{KeyEval}_{ct}$ or $\mathrm{KeyEval}_D$ to process access-controlled information based on x;
$\mathrm{KeyEval}_{ct}$ result and error bound: for a policy $f$ and attribute x, $$KeyEval_{ct}\left(f, x, \{B_i, c_i\}_{i=1}^l\right) \rightarrow c_f = D_{f,x}^T \cdot [c_1\| \ldots \|c_l] \in \mathbb{Z}_q^m,$$

and $c_f = [B_f + f(x) \; G]^T \cdot s + e_f$, where $\|e_f\|_\infty \le (m+1)^{d_{\mathcal{F}}} \cdot B$ with $d_{\mathcal{F}}$ being the depth of the policy circuit $f$, ensuring that the functioned ciphertext construction supports correct Eval and decryption.

\* \* \* \* \*